US009098811B2

(12) United States Patent
Petre et al.

(10) Patent No.: US 9,098,811 B2
(45) Date of Patent: Aug. 4, 2015

(54) SPIKING NEURON NETWORK APPARATUS AND METHODS

(75) Inventors: Csaba Petre, San Diego, CA (US); Botond Szatmary, San Diego, CA (US)

(73) Assignee: Brain Corporation, San Diego, CA (US)

( * ) Notice: Subject to any disclaimer, the term of this patent is extended or adjusted under 35 U.S.C. 154(b) by 237 days.

(21) Appl. No.: 13/488,106

(22) Filed: Jun. 4, 2012

(65) Prior Publication Data

US 2013/0325777 A1 Dec. 5, 2013

(51) Int. Cl.
*G06N 3/06* (2006.01)
*G06N 3/04* (2006.01)
*G06N 3/08* (2006.01)
*G06N 3/063* (2006.01)

(52) U.S. Cl.
CPC *G06N 3/049* (2013.01); *G06N 3/06* (2013.01); *G06N 3/0635* (2013.01); *G06N 3/088* (2013.01)

(58) Field of Classification Search
CPC .............................. G06N 3/0635; G06N 3/088
USPC ...................................................... 706/26, 45
See application file for complete search history.

(56) References Cited

U.S. PATENT DOCUMENTS

| 5,063,603 | A | 11/1991 | Burt |
| 5,138,447 | A | 8/1992 | Shen et al. |
| 5,216,752 | A | 6/1993 | Tam |
| 5,272,535 | A | 12/1993 | Elabd |
| 5,355,435 | A | 10/1994 | Deyong et al. |
| 5,638,359 | A | 6/1997 | Peltola et al. |
| 5,673,367 | A | 9/1997 | Buckley |

(Continued)

FOREIGN PATENT DOCUMENTS

| CN | 102226740 A | 10/2011 |
| JP | 4087423 | 3/1992 |

(Continued)

OTHER PUBLICATIONS

Fiete, et al., Spike-Time-Dependent Plasticity and Heterosynaptic Competition Organize Networks to Produce Long Scale-Free Sequences of Neural Activity, Neuron 65, Feb. 25, 2010, pp. 563-576.*

(Continued)

*Primary Examiner* — Wilbert L Starks
(74) *Attorney, Agent, or Firm* — Gazdzinski & Associates PC

(57) ABSTRACT

Apparatus and methods for heterosynaptic plasticity in a spiking neural network having multiple neurons configured to process sensory input. In one exemplary approach, a heterosynaptic plasticity mechanism is configured to select alternate plasticity rules when performing neuronal updates. The selection mechanism is adapted based on recent post-synaptic activity of neighboring neurons. When neighbor activity is low, a regular STDP update rule is effectuated. When neighbor activity is high, an alternate STDP update rule, configured to reduce probability of post-synaptic spike generation by the neuron associated with the update, is used. The heterosynaptic mechanism impedes that neuron to respond to (or learn) features within the sensory input that have been detected by neighboring neurons, thereby forcing the neuron to learn a different feature or feature set. The heterosynaptic methodology advantageously introduces competition among neighboring neurons, in order to increase receptive field diversity and improve feature detection capabilities of the network.

20 Claims, 20 Drawing Sheets

(56) References Cited

U.S. PATENT DOCUMENTS

| | | |
|---|---|---|
| 5,875,108 A | 2/1999 | Hoffberg |
| 6,009,418 A | 12/1999 | Cooper |
| 6,014,653 A | 1/2000 | Thaler |
| 6,035,389 A | 3/2000 | Grochowski |
| 6,418,424 B1 | 7/2002 | Hoffberg et al. |
| 6,458,157 B1 | 10/2002 | Suaning |
| 6,509,854 B1 | 1/2003 | Morita |
| 6,545,705 B1 | 4/2003 | Sigel et al. |
| 6,545,708 B1 | 4/2003 | Tamayama |
| 6,546,291 B2 | 4/2003 | Merfeld et al. |
| 6,581,046 B1 | 6/2003 | Ahissar |
| 6,625,317 B1 | 9/2003 | Gaffin et al. |
| 7,580,907 B1 | 8/2009 | Rhodes |
| 7,653,255 B2 | 1/2010 | Rastogi |
| 7,737,933 B2 | 6/2010 | Yamano et al. |
| 7,765,029 B2 | 7/2010 | Fleischer et al. |
| 7,849,030 B2 | 12/2010 | Ellingsworth |
| 8,000,967 B2 | 8/2011 | Taleb |
| 8,015,130 B2 | 9/2011 | Matsugu |
| 8,103,602 B2 | 1/2012 | Izhikevich |
| 8,160,354 B2 | 4/2012 | Paquier |
| 8,200,593 B2 | 6/2012 | Guillen |
| 8,311,965 B2 | 11/2012 | Breitwisch |
| 8,315,305 B2 | 11/2012 | Petre |
| 8,390,707 B2 | 3/2013 | Yamashita |
| 8,416,847 B2 | 4/2013 | Roman |
| 8,467,623 B2 | 6/2013 | Izhikevich |
| 8,583,286 B2 | 11/2013 | Fleischer et al. |
| 8,712,941 B2 | 4/2014 | Izhikevich et al. |
| 2002/0038294 A1 | 3/2002 | Matsugu |
| 2003/0050903 A1 | 3/2003 | Liaw |
| 2003/0216919 A1 | 11/2003 | Roushar |
| 2004/0136439 A1 | 7/2004 | Dewberry |
| 2004/0170330 A1 | 9/2004 | Fogg |
| 2004/0193670 A1 | 9/2004 | Langan et al. |
| 2005/0015351 A1 | 1/2005 | Nugent |
| 2005/0036649 A1 | 2/2005 | Yokono et al. |
| 2005/0283450 A1 | 12/2005 | Matsugu |
| 2006/0094001 A1 | 5/2006 | Torre |
| 2006/0129728 A1 | 6/2006 | Hampel |
| 2006/0161218 A1 | 7/2006 | Danilov |
| 2007/0022068 A1 | 1/2007 | Linsker |
| 2007/0176643 A1 | 8/2007 | Nugent |
| 2007/0208678 A1 | 9/2007 | Matsugu |
| 2008/0100482 A1 | 5/2008 | Lazar |
| 2008/0199072 A1 | 8/2008 | Kondo |
| 2008/0237446 A1 | 10/2008 | Oshikubo |
| 2009/0043722 A1 | 2/2009 | Nugent |
| 2009/0287624 A1 | 11/2009 | Rouat et al. |
| 2010/0036457 A1 | 2/2010 | Sarpeshkar |
| 2010/0081958 A1 | 4/2010 | She |
| 2010/0086171 A1 | 4/2010 | Lapstun |
| 2010/0100482 A1 | 4/2010 | Hardt |
| 2010/0166320 A1 | 7/2010 | Paquier |
| 2010/0225824 A1 | 9/2010 | Lazar |
| 2010/0235310 A1 | 9/2010 | Gage et al. |
| 2010/0299296 A1 | 11/2010 | Modha et al. |
| 2011/0016071 A1 | 1/2011 | Guillen |
| 2011/0119214 A1 | 5/2011 | Breitwisch |
| 2011/0119215 A1 | 5/2011 | Elmegreen |
| 2011/0137843 A1 | 6/2011 | Poon et al. |
| 2011/0160741 A1 | 6/2011 | Asano |
| 2012/0011090 A1 | 1/2012 | Tang |
| 2012/0083982 A1 | 4/2012 | Bonefas |
| 2012/0084240 A1 | 4/2012 | Esser et al. |
| 2012/0109866 A1 | 5/2012 | Modha |
| 2012/0303091 A1 | 11/2012 | Izhikevich |
| 2012/0308076 A1 | 12/2012 | Piekniewski |
| 2012/0308136 A1 | 12/2012 | Izhikevich |
| 2013/0073484 A1 | 3/2013 | Izhikevich |
| 2013/0073491 A1 | 3/2013 | Izhikevich |
| 2013/0073492 A1 | 3/2013 | Izhikevich |
| 2013/0073495 A1 | 3/2013 | Izhikevich |
| 2013/0073496 A1 | 3/2013 | Szatmary |
| 2013/0073498 A1 | 3/2013 | Izhikevich |
| 2013/0073499 A1 | 3/2013 | Izhikevich |
| 2013/0073500 A1 | 3/2013 | Szatmary |
| 2013/0151450 A1 | 6/2013 | Ponulak |
| 2013/0218821 A1 | 8/2013 | Szatmary |
| 2013/0251278 A1 | 9/2013 | Izhikevich |
| 2013/0297539 A1 | 11/2013 | Piekniewski et al. |
| 2013/0297541 A1 | 11/2013 | Piekniewski et al. |
| 2013/0297542 A1 | 11/2013 | Piekniewski et al. |
| 2013/0325766 A1 | 12/2013 | Petre et al. |
| 2013/0325768 A1 | 12/2013 | Sinyavskiy |
| 2013/0325773 A1 | 12/2013 | Sinyavskiy |
| 2013/0325774 A1 | 12/2013 | Sinyavskiy |
| 2013/0325775 A1 | 12/2013 | Sinyavskiy |
| 2013/0325777 A1 | 12/2013 | Petre et al. |
| 2014/0012788 A1 | 1/2014 | Piekniewski |
| 2014/0016858 A1 | 1/2014 | Richert |
| 2014/0032458 A1 | 1/2014 | Sinyavskiy |
| 2014/0032459 A1 | 1/2014 | Sinyavskiy |
| 2014/0052679 A1 | 2/2014 | Sinyavskiy |
| 2014/0064609 A1 | 3/2014 | Petre et al. |
| 2014/0122397 A1 | 5/2014 | Richert |
| 2014/0122398 A1 | 5/2014 | Richert |
| 2014/0122399 A1 | 5/2014 | Szatmary |
| 2014/0156574 A1 | 6/2014 | Piekniewski |

FOREIGN PATENT DOCUMENTS

| | | |
|---|---|---|
| RU | 2108612 C1 | 10/1998 |
| RU | 2406105 C2 | 12/2010 |
| RU | 2424561 C2 | 7/2011 |
| WO | 2008083335 A2 | 7/2008 |
| WO | 2008132066 A1 | 11/2008 |

OTHER PUBLICATIONS

Niv, et al., Evolution of Reinforcement Learning in Uncertain Environments: A Simple Explanation for Complex Foraging Behaviors, International Society for Adaptive Behavior, 2002, vol. 10(1), pp. 5-24.*

Berkes and Wiskott. Slow feature analysis yields a rich repertoire of complex cell properties. *Journal of Vision* (2005) vol. 5 (6).

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepages, cwi ,n11-sbolltedmblica6ond)hdthesislxif>.

Brette et al., Brian: a simple and flexible simulator for spiking neural networks, The Neuromorphic Engineer, Jul. 1, 2009, pp. 1-4, doi: 10.2417/1200906.1659.

Cessac et al. 'Overview of facts and issues about neural coding by spikes.' Journal of Physiology, Paris 104.1 (2010): 5.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. 'Probability distributions of the logarithm of inter-spike intervals yield accurate entropy estimates from small datasets.' Journal of neuroscience methods 173.1 (2008): 129.

Fidjeland et al., Accelerated Simulation of Spiking Neural Networks Using GPUs [online],2010 [retrieved on Jun. 15, 2013], Retrieved from the Internet: URL:http://ieeexplore.ieee.org/xpls/abs_all.jsp?ammber=5596678&tag=1.

Field, G.; Chichilnisky, E. Information Processing in the Primate Retina: Circuitry and Coding. *Annual Review of Neuroscience*, 2007, 30(1), 1-30.

Fiete, et al. Spike-Time-Dependent Plasticity and Heterosynaptic Competition Organize Networks to Produce Long Scale-Free Sequences of Neural Activity. *Neuron* 65, Feb. 25, 2010, pp. 563-576.

Floreano et al., 'Neuroevolution: from architectures to learning' Evol. Intel. Jan. 2008 1:47-62, [retrieved Dec. 30, 2013] [retrieved

(56) References Cited

OTHER PUBLICATIONS online from URL:<http://inforscience.epfl.ch/record/112676/files/FloreanoDuerrMattiussi2008.p. df>.
Földiák, P. Learning invariance from transformation sequences. *Neural Computation*, 1991, 3(2), 194-200.
Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.
Gerstner et al. (1996) A neuronal learning rule for sub-millisecond temporal coding. *Nature* vol. 383 (6595) pp. 76-78.
Gewaltig et al., 'NEST (Neural Simulation Tool)', Scholarpedia, 2007, pp. 1-15, 2(4): 1430, doi: 10.4249/scholarpedia.1430.
Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.
Gluck, Stimulus Generalization and Representation in Adaptive Network Models of Category Learning [online], 1991 [retrieved on Aug. 24, 2013]. Retrieved from the Internet:<URL:http:// www.google.com/url?sa=t&rct=j&q=Giuck+%22STIMULUS+GENERALIZATION+AND+REPRESENTATIO N+1 N +ADAPTIVE+NETWORK+MODELS+OF+CATEGORY+LEARN I NG%22+ 1991.
Gollisch et al. 'Rapid neural coding in the retina with relative spike latencies.' Science 319.5866 (2008): 1108-1111.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 10.3389/conf. fninf.2011.08.00098.
Graham, Lyle J., The Surf-Hippo Reference Manual, http:// www.neurophys.biomedicale.univparis5. fr/-graham/surf-hippo-files/Surf-Hippo%20Reference%20Manual.pdf, Mar. 2002, pp. 1-128.
Hopfield JJ (1995) Pattern recognition computation using action potential timing for stimulus representation. *Nature* 376: 33-36.
Izhikevich E. M. and Hoppensteadt F.C. (2009) Polychronous Wavefront Computations. *International Journal of Bifurcation and Chaos*, 19:1733-1739.
Izhikevich E.M. (2004) Which Model to Use for Cortical Spiking Neurons? *IEEE Transactions on Neural Networks*, 15:1063-1070.
Izhikevich E.M. (2006) Polychronization: Computation With Spikes. *Neural Computation*,18:245-282.
Izhikevich et al., 'Relating STDP to BCM', Neural Computation (2003) 15, 1511-1523.
Izhikevich, E.M. (2007) Dynamical Systems in Neuroscience: The Geometry of Excitability and Bursting, *The MIT Press*, 2007.
Izhikevich, 'Simple Model of Spiking Neurons', IEEE Transactions on Neural Networks, vol. 14, No. 6, Nov. 2003, pp. 1569-1572.
Janowitz, M.K.; Van Rossum, M.C.W. Excitability changes that complement Hebbian learning. *Network, Computation in Neural Systems*, 2006, 17 (1), 31-41.
Karbowski et al., 'Multispikes and Synchronization in a Large Neural Network with Temporal Delays', Neural Computation 12, 1573-1606 (2000).
Khotanzad, Alireza, Classification of invariant image representations using a neural network, IEEF. Transactions on Acoustics, Speech, and Signal Processing vol. 38 No. 6 Jun. 1990 pp. 1028-1038.
Khotanzad, 'Classification of invariant image representations using a neural network' IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.
Knoblauch, et al. Memory Capacities for Synaptic and Structural Plasticity, *Neural Computation* 2009, pp. 1-45.
Laurent, 'Issue 1—nnql—Refactor Nucleus into its own file—Neural Network Query Language' [retrieved on Nov. 12, 2013]. Retrieved from the Internet: URL:https:// code.google.com/p/nnql/issues/detail?id=1.
Laurent, 'The Neural Network Query Language (NNQL) Reference' [retrieved on Nov. 12, 2013]. Retrieved from the Internet: <URL'https://code.google.com/p/nnql/issues/detail?id=1>.
Lazar et al. 'A video time encoding machine', in Proceedings of the 15th IEEE International Conference on Image Processing (ICIP '08), 2008, pp. 717-720.
Lazar et al. 'Consistent recovery of sensory stimuli encoded with MIMO neural circuits.' Computational intelligence and neuroscience (2010): 2.
Lazar et al. 'Multichannel time encoding with integrate-and-fire neurons.' Neurocomputing 65 (2005): 401-407.
Masquelier and Thorpe. Learning to recognize objects using waves of spikes and Spike Timing-Dependent Plasticity. *Neural Networks* (IJCNN), The 2010 International Joint Conference on DOI—10.1109/IJCNN.2010.5596934 (2010) pp. 1-8.
Masquelier, Timothee. 'Relative spike time coding and STOP-based orientation selectivity in the early visual system in natural continuous and saccadic vision: a computational model.' Journal of computational neuroscience 32.3 (2012): 425-441.
Meister, M. Multineuronal codes in retinal signaling. *Proceedings of the National Academy of sciences*. 1996, 93, 609-614.
Meister, M.; Berry, M.J. The neural code of the retina, *Neuron*. 1999, 22, 435-450.
Nichols, A Re configurable Computing Architecture for Implementing Artificial Neural Networks on FPGA, Master's Thesis, The University of Guelph, 2003, pp. 1-235.
Oster M., Lichtsteiner P., Delbruck T, Liu S. A Spike-Based Saccadic Recognition System, *ISCAS 2007. IEEE International Symposium on Circuits and Systems*, 2009, pp. 3083-3086.
Paugam-Moisy et al. 'Computing with spiking neuron networks.' Handbook of Natural Computing, 40 p. Springer, Heidelberg (2009).
Paugam-Moisy et al., "Computing with spiking neuron networks" G. Rozenberg T, Back, J. Kok (Eds.), Handbook of Natural Computing, Springer-Verlag (2010) [retrieved Dec. 30, 2013], [retrieved online from link.springer.com].
Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.
Rekeczky, et al., "Cellular Multiadaptive Analogic Architecture: A Computational Framework for UAV Applications." May 2004.
Revow M., Williams C., and Hinton, G.E., 1996, Using Generative Models for Handwritten Digit Recognition, *IEEE Trans. on Pattern Analysis and Machine Intelligence*, 18, No. 6, Jun. 1996.
Sanchez, Efficient Simulation Scheme for Spiking Neural Networks, *Doctoral Thesis, Universiia di Granada* Mar. 28, 2008, pp. 1-104.
Sato et al., 'Pulse interval and width modulation for video transmission.' Cable Television, IEEE Transactions on 4 (1978): 165-173.
Schemmel, J., et al. Implementing synaptic plasticity in a VLSI spiking neural network model, Proceedings of the 2006 International Joint Conference on Neural Networks, Jul. 2006 pp. 1-6.
Schnitzer, M.J.; Meister, M.; Multineuronal Firing Patterns in the Signal from Eye to Brain. *Neuron*, 2003, 37, 499-511.
Serrano-Gotarredona, et al, "On Real-Time: AER 2-D Convolutions Hardware for Neuromorphic Spike-based Cortical Processing", Jul. 2008.
Simulink.RTM. model [online], [Retrieved on Dee. 10, 2013] Retrieved from <URL: http://www.mathworks.com/ products/simulink/index.html>.
Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).
Sjostrom et al., 'Spike-Timing Dependent Plasticity' Scholarpedia, 5(2):1362 (2010), pp. 1-18.
Szatmary et al., 'Spike-timing Theory of Working Memory' PLoS Computational Biology, vol. 6, Issue 8, Aug. 19, 2010 [retrieved on

(56) References Cited

OTHER PUBLICATIONS

Dec. 30, 2013]. Retrieved from the Internet: <URL: http://www.ploscompbiol.org/article/info%3Adoi% 2F10.1371 %2Fjournal.pcbi.10008 79#>.

Thomas S. and Riesenhuber, M, 2004, Realistic Modeling of Simple and Complex Cell Tuning in the HMAX Model, and Implications for Invariant Object Recognition in Cortex, *AI Memo* 2004-017 Jul. 2004.

Thorpe, S.J., Delorme, A. & VanRullen, R. (2001). Spike-based strategies for rapid processing. *Neural Networks* 14, pp. 715-725.

Thorpe, S.J., Guyonneau, R., Guilbaud, N., Allegraud, J-M. & VanRullen, R. (2004). SpikeNet: real-time visual processing with one spike per neuron. *Neurocomputing*, 58-60, pp. 857-864.

Tim Gollisch* and Markus Meister (2008) Rapid Neural Coding in the Retina with Relative Spike Latencies. *Science* 319:1108-1111.

Van Rullen R.; Thorpe, S. Rate Coding versus temporal order coding: What the Retinal ganglion cells tell the visual cortex. *Neural computation*, 2001, 13, 1255-1283.

VanRullen, R. & Koch, C. (2003). Is perception discrete or continuous? *Trends in Cognitive Sciences* 7(5), pp. 207-213.

VanRullen, R., Guyonneau, R. & Thorpe, S.J. (2005). Spike times make sense. *Trends in Neurosciences* 28(1).

Wallis, G.; Rolls, E. T. A model of invariant object recognition in the visual system. *Progress in Neurobiology*. 1997, 51, 167-194.

Wang 'The time dimension for scene analysis.' Neural Networks, IEEE Transactions on 16.6 (2005): 1401-1426.

Wiskott, L.; Sejnowski, T.J. Slow feature analysis: Unsupervised learning of invariances. *Neural Computation*, 2002, 14, (4), 715-770.

Zarandy, et al., "Bi-i: A Standalone Ultra High Speed Cellular Vision System", Jun. 2005.

\* cited by examiner

SPIKING NEURON NETWORK APPARATUS AND METHODS

CROSS-REFERENCE TO RELATED APPLICATIONS

This application is related to co-owned U.S. patent application Ser. No. 13/152,119, entitled "SENSORY INPUT PROCESSING APPARATUS AND METHODS", filed on Jun. 2, 2011, co-owned and co-pending U.S. patent application Ser. No. 13/465,924, entitled "SPIKING NEURAL NETWORK FEEDBACK APPARATUS AND METHODS", filed May 7, 2012, co-owned and co-pending U.S. patent application Ser. No. 13/465,903 entitled "SENSORY INPUT PROCESSING APPARATUS IN A SPIKING NEURAL NETWORK", filed May 7, 2012, co-owned U.S. patent application Ser. No. 13/465,918, entitled "SPIKING NEURAL NETWORK OBJECT RECOGNITION APPARATUS AND METHODS", filed May 7, 2012, and co-owned and co-pending U.S. patent application Ser. No. 13/488,114, filed on Jun. 4, 2012, entitled "SPIKING NEURON NETWORK APPARATUS AND METHODS" each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Invention

The present innovation relates generally to artificial neural networks and more particularly in one exemplary aspect to computer apparatus and methods for pulse-code neural network processing of sensory input.

2. Description of Related Art

Artificial spiking neural networks are frequently used to gain an understanding of biological neural networks, and for solving artificial intelligence problems. These networks typically employ a pulse-coded mechanism, which encodes information using timing of the pulses. Such pulses (also referred to as "spikes" or 'impulses') are short-lasting (typically on the order of 1-2 ms) discrete temporal events. Several exemplary embodiments of such encoding are described in a commonly owned and co-pending U.S. patent application Ser. No. 13/152,084 entitled APPARATUS AND METHODS FOR PULSE-CODE INVARIANT OBJECT RECOGNITION", filed Jun. 2, 2011, and U.S. patent application Ser. No. 13/152,119, Jun. 2, 2011, entitled "SENSORY INPUT PROCESSING APPARATUS AND METHODS", each incorporated herein by reference in its entirety.

A typical artificial spiking neural network, such as the network 100 shown for example in FIG. 1 herein, comprises a plurality of units (or nodes) 102, which correspond to neurons in a biological neural network. Any given unit 102 may receive input via connections 104, also referred to as communications channels, or synaptic connections. Any given unit 102 may further be connected to other units via connections 112, also referred to as communications channels, or synaptic connections. The units (e.g., the units 106 in FIG. 1) providing inputs to any given unit via for example connections 104, are commonly referred to as the pre-synaptic units, while the unit receiving the inputs (e.g., the units 102 in FIG. 1) is referred to as the post-synaptic unit. Furthermore, the post-synaptic unit of one unit layer (e.g. the units 102 in FIG. 1) can act as the pre-synaptic unit for the subsequent upper layer of units (not shown).

Each of the connections (104, 112 in FIG. 1) is assigned, inter alia, a connection efficacy (which in general refers to a magnitude and/or probability of influence of pre-synaptic spike to firing of a post-synaptic neuron, and may comprise for example a parameter such as synaptic weight, by which one or more state variables of post synaptic unit are changed). During operation of the pulse-code network (e.g., the network 100), synaptic weights are typically adjusted using a mechanism such as e.g., spike-timing dependent plasticity (STDP) in order to implement, among other things, learning by the network.

One such adaptation mechanism is illustrated with respect to FIGS. 2-3. Traces 200, 210 in FIG. 2 depict pre-synaptic input spike train (delivered for example via connection 104_1 in FIG. 1) and post synaptic output spike train (generated, for example, by the neuron 102_1 in FIG. 1), respectively.

Properties of the connections 104 (such as weights w) are typically adjusted based on relative timing between the pre-synaptic input (e.g., the pulses 202, 204, 206, 208 in FIG. 2) and post-synaptic output pulses (e.g., the pulses 214, 216, 218 in FIG. 2). One typical STDP weight adaptation rule is illustrated in FIG. 3, where the rule 300 depicts synaptic weight change $\Delta w$ as a function of the time difference between the time of post-synaptic output generation and arrival of pre synaptic input $\Delta t = t_{post} - t_{pre}$. In some implementations, synaptic connections (e.g., the connections 104 in FIG. 1) delivering pre-synaptic input prior to the generation of post-synaptic response are potentiated (as indicated by $\Delta w > 0$ associated with the curve 302), while synaptic connections (e.g., the connections 104 in FIG. 1) delivering pre-synaptic input subsequent to the generation of post-synaptic response are depressed (as indicated by $\Delta w < 0$ associated with the curve 304 in FIG. 3). By way of illustration, when the post-synaptic pulse 208 in FIG. 2 is generated: (i) connection associated with the pre-synaptic input 214 precedes the output pulse (indicated by the line denoted 224) and it is potentiated ($\Delta w > 0$ in FIG. 3 and the weight is increased); and (ii) connections associated with the pre-synaptic input 216, 218 that follow are depressed ($\Delta w < 0$ in FIG. 3 and the weights are decreased).

Neural networks, such as that illustrated in FIG. 1, are often utilized to process visual signals, such as spiking signals provided by retinal gangling cells (RGCs) of neuroretina and/or output interface of artificial retina. In these applications, neurons (e.g., the neurons 102 in FIG. 1) receive inputs (e.g. via connections 104) from RGCs associated with overlapping regions of the visual field, denoted by dashed curve 108 in FIG. 1. Over time, the neurons 102 learn to respond to features presented in the visual input, and develop respective receptive fields as described, for example, in co-pending and co-owned U.S. patent application Ser. No. 13/152,119, entitled "SENSORY INPUT PROCESSING APPARATUS AND METHODS", incorporated supra. Learning may involve changing of synaptic weights of feed-forward connections to the neurons from RGCs, for example. In some cases, these learned receptive fields correspond to orientated receptive fields resembling simple cells observed in biology.

In some applications, visual receptive fields may be described in two dimensions as response to certain patterns of light representing visual features in the image (e.g. oriented lines, color patterns, or more complex shapes, etc.) Receptive fields may also have a temporal component, such that the receptive field is a two-dimensional shape that changes with time until the point of firing of the cell.

Accordingly, there is a salient need for additional mechanisms to produce receptive field diversity and improve feature detection capabilities of the network when processing sensory inputs, such as for example by introducing competition for features among neurons.

SUMMARY OF THE INVENTION

The present invention satisfies the foregoing needs by providing, inter alia, apparatus and methods for enhancing performance of a neural network. In one aspect of the invention, a method of enhancing performance (including e.g., the receptive diversity) of a neural network is disclosed. In one implementation, a heterosynaptic plasticity approach is used for one or more connections configured to communicate an input to a spiking neuron of the network, and the method includes: operating the connection in accordance with a first plasticity mechanism; and based at least in part on an indication, operating the connection in accordance with a second (different) plasticity mechanism.

In a second aspect of the invention, computerized spiking neuronal apparatus is disclosed. In one implementation, the apparatus includes a storage medium, the storage medium comprising a plurality of executable instructions being configured to, when executed: configure adjustment of excitability of a neuron in accordance with a first mechanism, the configuration being based at least in part on one or more feed-forward inputs; and based at least in part on an indication, configure adjustment of excitability of the neuron in accordance with a second mechanism. In one variant, the second mechanism is configured to reduce a probability of a response by the neuron to the feed-forward input subsequent to the indication.

In another implementation, the apparatus is operative to process sensory input, and includes: first and second neurons configured to: (i) receive the input via first and second feed-forward connections, respectively, and (ii) communicate with one another via one or more lateral connections, and a storage medium in signal communication with the first and second neurons. In one variant, the storage medium includes a plurality of instructions configured to, when executed: generate a response by the second neuron, based at least in part on receiving the input via the second feed-forward connection; communicate an indication related to the response to the first neuron via at least one of the one or more lateral connections; operate the first neuron in accordance with a first spike-timing dependent plasticity (STDP) mechanism, the operation configured to generate an output by the first neuron based at least in part on receiving the input via the first feed-forward connection; and based at least in part on the indication, operate the first neuron in accordance with a second STDP mechanism.

In a third aspect of the invention, a method for increasing receptive field diversity in a neural network having a plurality of neurons is disclosed. In one implementation, the method comprises a heterosynaptic approach including: for at least a first one of the plurality of neurons that respond to a stimulus, applying a first plasticity mechanism; and for a second and at least portion of other ones of the plurality of neurons that respond to the stimulus, applying a second plasticity mechanism different than the first.

In a fourth aspect of the invention, a computer readable apparatus is disclosed. In one implementation the apparatus comprises a storage medium having at least one computer program stored thereon. The program is configured to, when executed, implement an artificial neuronal network with enhanced receptive field diversity.

In a fifth aspect of the invention, a system is disclosed. In one implementation, the system comprises an artificial neuronal (e.g., spiking) network having a plurality of nodes associated therewith, and a controlled apparatus (e.g., robotic or prosthetic apparatus).

In a sixth aspect of the invention, a robotic apparatus capable of more rapid recognition of features is disclosed. In one implementation, the apparatus includes a neural network-based controller that implements heterogeneous plasticity rules for learning.

Further features of the present invention, its nature and various advantages will be more apparent from the accompanying drawings and the following detailed description.

Figure 1:
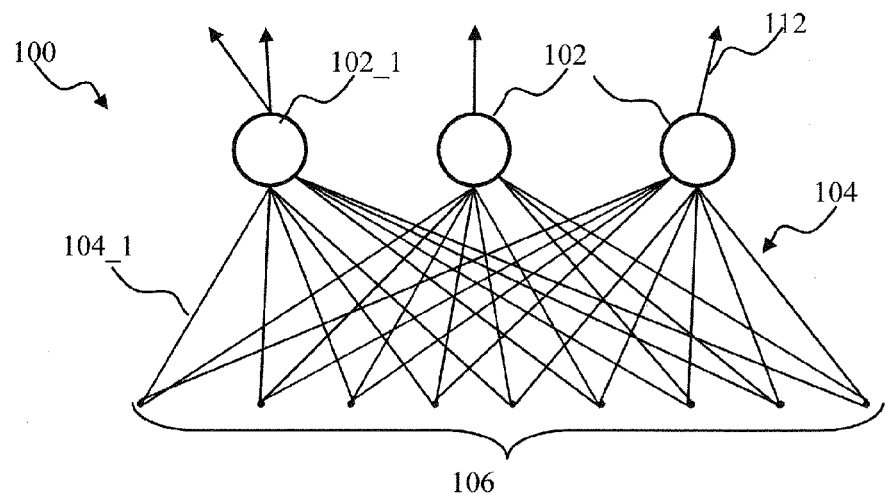
FIG. 1 is a block diagram depicting an artificial spiking neural network.
Figure 2:
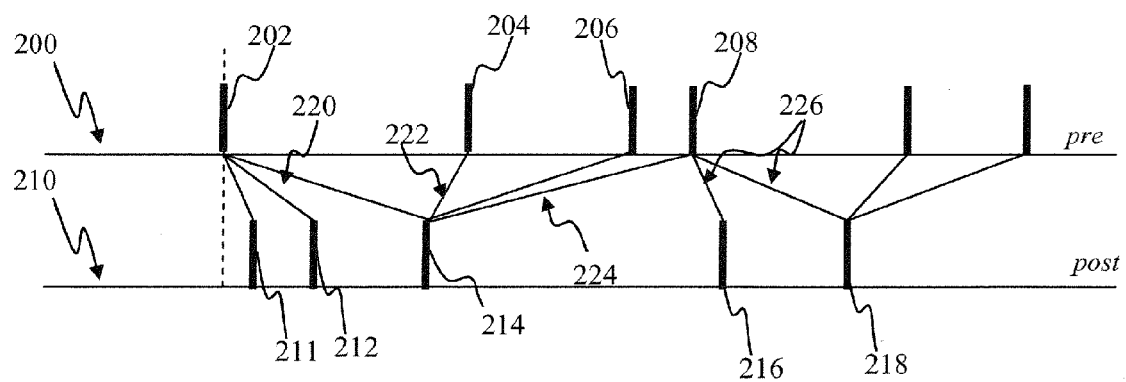
FIG. 2 is a graphical illustration depicting spike timing in the spiking network of FIG. 1.

All Figures disclosed herein are © Copyright 2012 Brain Corporation. All rights reserved.

DETAILED DESCRIPTION

Embodiments and implementations of the present invention will now be described in detail with reference to the drawings, which are provided as illustrative examples so as to enable those skilled in the art to practice the invention. Notably, the figures and examples below are not meant to limit the scope of the present invention to a single embodiment or implementation, but other embodiments and implementations are possible by way of interchange of or combination with some or all of the described or illustrated elements. Wherever convenient, the same reference numbers will be used throughout the drawings to refer to same or like parts.

Where certain elements of these embodiments or implementations can be partially or fully implemented using known components, only those portions of such known components that are necessary for an understanding of the present invention will be described, and detailed descriptions of other portions of such known components will be omitted so as not to obscure the invention.

In the present specification, an embodiment or implementations showing a singular component should not be considered limiting; rather, the invention is intended to encompass other embodiments or implementations including a plurality of the same component, and vice-versa, unless explicitly stated otherwise herein.

Further, the present invention encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the terms "connection", "link", "synaptic channel", "transmission channel", "delay line", are meant generally to denote a causal link between any two or more entities (whether physical or logical/virtual), which enables information exchange between the entities.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "receptive field" is used to describe sets of weighted inputs from filtered input elements, where the weights are adjusted.

As used herein, the term "Wi-Fi" refers to, without limitation, any of the variants of IEEE-Std. 802.11 or related standards including 802.11a/b/g/n/s/v.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, and infrared (e.g., IrDA).

Overview

The present invention provides, in one salient aspect, apparatus and methods for increasing receptive field diversity in a neural network by, inter cilia, introducing competition among neurons, such as via heterosynaptic plasticity, in order to enable different neurons to respond to different input features. The heterosynaptic plasticity is effectuated, in one or more implementations, using at least two different plasticity mechanisms: (i) one (regular) STDP mechanism for at least one first neuron that responds to a stimulus; and (ii) a different mechanism(s) for other neurons that may respond to the stimulus. In one implementation, the at least one first neuron responds before the other neurons do, and the STDP learning rule for feed-forward connections to a given neuron is modulated by spiking activity of neighboring neurons, with which the neuron is competing for features. This approach advantageously increases the receptive diversity of the network as a whole.

In some implementations, each neuron may maintain a decaying trace of neighboring neuron activity. The neighbor activity traces may be stored for example in memory separate from the memory containing neuronal state information. When the trace value is above a threshold, instead of applying the regular STDP curve to its input synapses, an alternate STDP rule is applied such that the connection efficacy (e.g., the weight change) is zero for pre-synaptic adjustment and negative for post-synaptic adjustment.

In one or more implementations, response history (e.g., pulse-generation times) of neighboring neurons may be recorded and used for subsequent plasticity adjustments. Layer-based coordination may also be employed; e.g., the neighbor activity traces of a first layer (layer 1) may be stored in another layer (e.g., layer 2) of neurons that may comprise feedback connections configured to notify layer 1 neurons of neighbor activity in layer 1.

Application of the plasticity rules described herein may advantageously facilitate formation of receptive fields for particular input features, represented for example by the pattern of input connection weights from spatiotemporal filters or RGCs to units or neurons.

In one or more implementations, the STDP curve may modulated with respect to an additional variable intrinsic to the neuron, for example, the membrane voltage or a function of the membrane voltage (e.g. a moving average over some time window). The modulation may be a function the additional variable, intrinsic variable, and/or another variable or variables. In some implementations, the membrane voltage may be compared with another parameter, such as a threshold. The difference between the threshold and the membrane voltage may be used to modulate the STDP curve. In some implementations, this threshold may a function of the neighbor activity, for example, the neighbor activity trace (NAT) described herein.

In another aspect of the disclosure, connection adjustment methodologies are used to implement processing of visual sensory information and object recognition using spiking neuronal networks. In some implementations, portions of the object recognition apparatus are embodied in a remote computerized apparatus (e.g., server), comprising a computer readable apparatus.

Embodiments of the feature detection functionality of the present disclosure are useful in a variety of applications including for instance a prosthetic device, autonomous robotic apparatus, and other electromechanical devices requiring visual or other sensory data processing functionality.

Spiking Network Heterosynaptic Plasticity

Detailed descriptions of the various embodiments and implementations of the apparatus and methods of the disclosure are now provided. Although certain aspects of the disclosure can best be understood in the context of the visual and sensory information processing using spiking neural networks, the disclosure is not so limited, and implementations of the disclosure may also be used in a wide variety of other applications, including for instance in implementing connection adaptation in pulse-code neural networks.

Implementations of the disclosure may be for example deployed in a hardware and/or software realization of a neuromorphic computer system. In one such implementation, a robotic system may include a processor embodied in an application specific integrated circuit, which can be adapted or configured for use in an embedded application (such as a prosthetic device).

Figure 4:
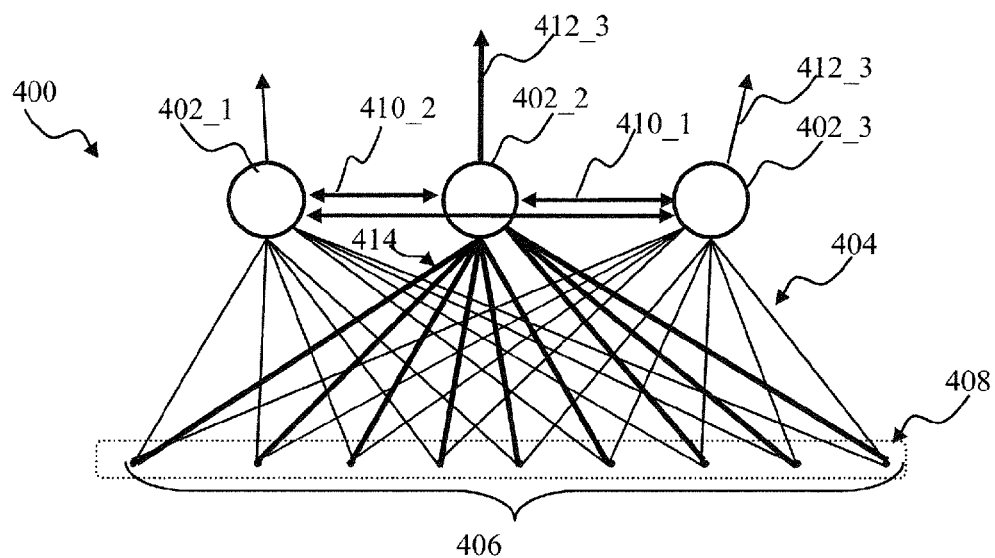
FIG. 4 is a block diagram depicting an artificial spiking neural network according to one implementation of the invention.

FIG. 4 illustrates one exemplary implementation of a spiking neuronal network of the disclosure, configured to process sensory information using heterosynaptic plasticity. The network 400 comprises a plurality of spiking neurons 402, configured to receive feed-forward spiking input via connections 404. In some implementations, the channels 404 carry pre-synaptic input (pulses) from pre-synaptic neurons (e.g., neurons 408 configured to implement functionality of neuroretina RGC layer), which encode some aspects of the sensory input into different spike patterns.

The neurons 402 are also configured to generate post-synaptic responses (such as for example those described in co-owned and co-pending U.S. patent application Ser. No. 13/152,105 filed on Jun. 2, 2011, and entitled "APPARATUS AND METHODS FOR TEMPORALLY PROXIMATE OBJECT RECOGNITION", incorporated by reference herein in its entirety) which are propagated via feed-forward connections 412. Post-synaptic spike generation is well-established in the spiking network arts, and accordingly will not be described in detail herein for brevity and clarity of presentation of the inventive aspects of the present invention.

Contrasted with the prior art network 100 described with respect to FIG. 1 supra, the inventive network 400 of FIG. 4 comprises a heterosynaptic plasticity mechanism. In one or more implementations, such as that depicted in FIG. 4, the network may comprise one or more lateral connections denoted by arrows 410 among neighboring neurons 402, in FIG. 4. These lateral interconnects 410_1, 410_2 may be used to notify one neuron (e.g., the neurons 402_2 in FIG. 4) of activity of neighboring neurons (e.g., the neurons 402_1, 402_3 in FIG. 4).

By way of illustration, if two or more neurons 402 receive at least a portion of the feed-forward input associated with a particular feature via connections. When the neuron 402_2 is the first to a generate response (associated with detecting that feature in the input) at time then only those connections that are associated with the neuron 402_2 are adapted. In one or more implementations, even when another neuron (e.g., 402_3) generates a response for the same feature at time $t_2 > t_1$, the connections associated with the later-responding neuron (e.g., 402_3) may be subject to a different adaptation rule (e.g., they do not get potentiated). These neurons may be, for example, neighboring or adjacent; that is, receiving input from overlapping subsets of the feed-forward input.

Figure 4A:
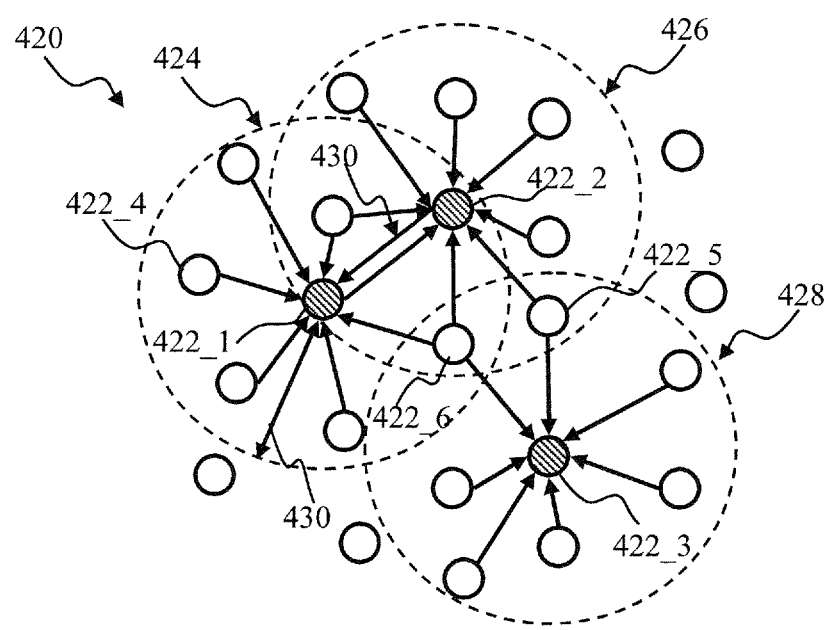
FIG. 4A is a block diagram depicting connectivity in artificial spiking neural network useful for implementing a heterosynaptic plasticity mechanism, according to one implementation of the invention.

In some implementations, neurons may receive inputs from subsets of the input space corresponding to receptive field areas (an exemplary case is illustrated in FIG. 4A). The neurons such as the neurons 422_1, 422_2, 422_3 in FIG. 4A may be assigned coordinates corresponding to a spatial mapping. An exemplary 2D space is shown in FIG. 4A. The neurons (e.g., the neuron 422_1 in FIG. 4A) may receive signals related to the activities of neighboring neurons (e.g., the neuron 422_4 in FIG. 4A) that are disposed at spatial locations within a certain radius 430 from the neuron (e.g., the neuron 422_1 in FIG. 4A).

The neurons 422_1, 422_2, 422_3 receive neighbor activity indications from neuron subsets denoted by the dashed circles 424, 426, 428, respectively, in FIG. 4A. In some implementations, the subsets 424, 426, 428 may correspond to receptive fields of the respective neurons (e.g., the neurons 422_1, 422_2, 422_3 in FIG. 4A). In some implementations, the receptive field areas of neighboring neurons may overlap.

In some implementations, the influence of heterosynaptic plasticity may be local. In these implementations, a neuron within the receptive field (e.g., neuron 422_4 in FIG. 4A) provides neighboring neuron activity indications only to the neurons within the same subset (e.g., the neuron 422_1 of the subset 424 in FIG. 4A).

In some implementations, the influence of heterosynaptic plasticity may extend to more than one subset, thereby affecting neurons within two or more receptive fields. In the implementation illustrated in FIG. 4A, neuron 422_4 may provide neighboring neuron activity indications to the neurons within the subset 426 (e.g., neuron 422_2) and the neurons within the subset 428 (e.g., neuron 422_3). Similarly, neuron 422_56 may provide neighboring neuron activity indications to the neurons within the subset 423 (e.g., neuron 422_1), the neurons within the subset 426 (e.g., neuron 422_2), and the neurons within the subset 428 (e.g., neuron 422_3), as show in FIG. 4A.

In some implementations, the subset of neurons sending heterosynaptic signaling (considered neighboring neurons) may be selected through other criteria, such as a certain number of closest neurons, or neurons within a specific area.

In some implementations (not shown), the neurons in FIG. 4A may be configured to receive heterosynaptic signaling from all neurons, such that the heterosynaptic signaling connectivity is all-to-all.

In some implementations, if the neuron generates a response at time $t_2$, for a time interval $t_3 > t_2 > t_1$, the connections associated with the later-responding neuron are not potentiated. This time interval corresponds for instance to a time within which it is likely that the neuron which fired at $t_2$ is responding to the same feature as the neuron which fired at $t_1$. These connections associated with the late responding neuron may accordingly be depressed, so as to prevent the $t_2$ neuron from 'duplicating the efforts' of the $t_1$ neuron. This may force the $t_2$ neuron to eventually respond for and learn a different feature, and hence ultimately increasing receptive field diversity.

As will be appreciated by those skilled in the arts given the present disclosure, that interconnects 410 may comprise logical links which may be, in some implementations, be effectuated using dedicated or shared message queue(s) configured to distribute updates of neuronal post-synaptic activity. In some implementations, activity updates of the neurons 402 may be distributed by one or more additional layers of neurons. Shared memory (e.g., physical or virtual) may be used in some implementations to distribute activity updates, and one or more dedicated or shared buses (e.g., as described with respect to FIGS. 11A-11D below) may be used to distribute activity updates. These distribution mechanisms may comprise e.g., point-to-point communications or broadcast notifications, or yet other approaches.

Figure 5:
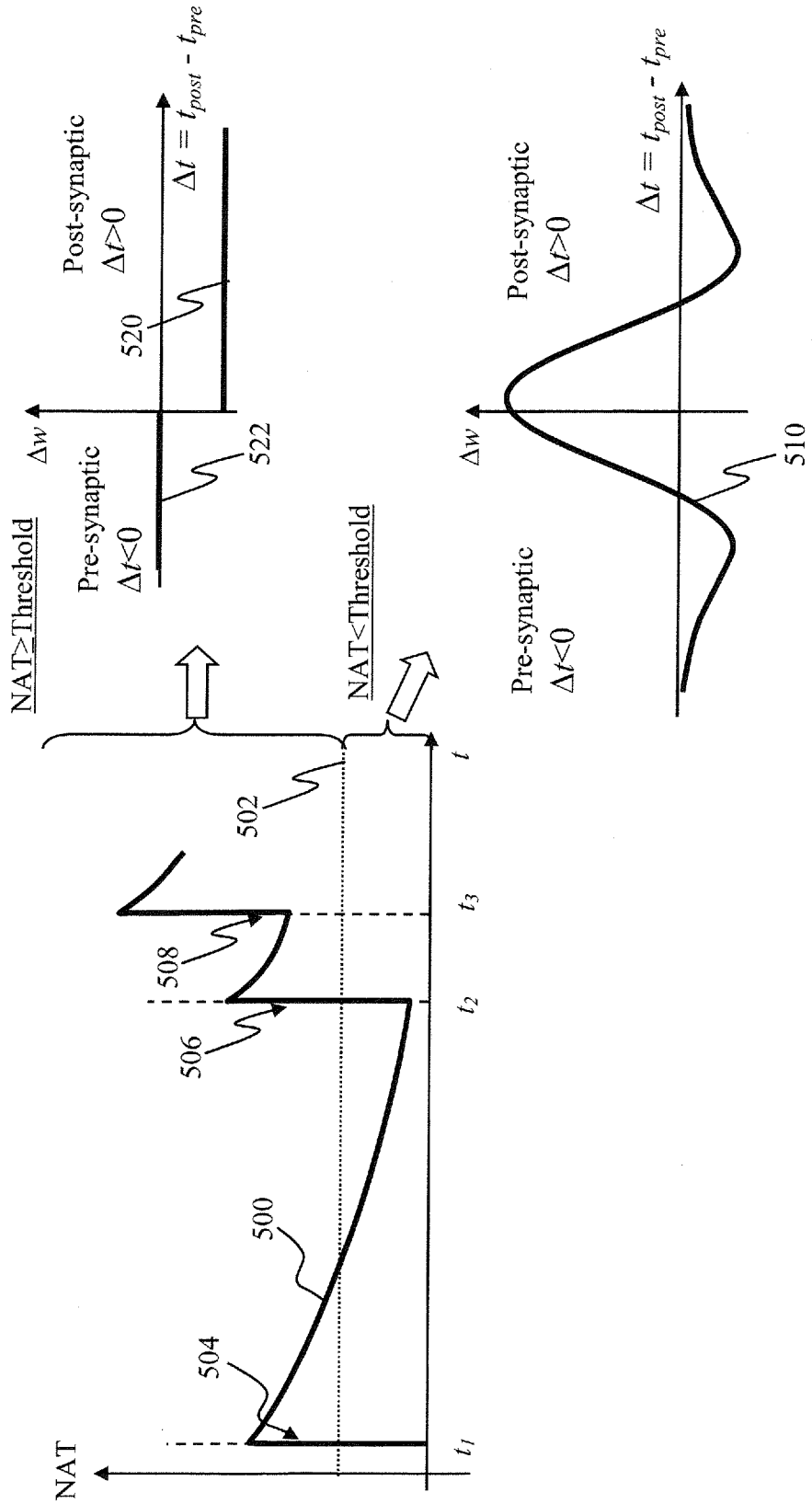
FIG. 5 is a plot illustrating spike-time dependent plasticity rules useful with the heterosynaptic update mechanism of FIG. 4 in accordance with one or more implementations.

In the exemplary implementation, this information related to post-synaptic activity of neighboring neurons is used to implement heterosynaptic plasticity mechanism of the disclosure, as described with respect to FIGS. 4-6. By way of illustration, when a neuron (e.g., the neuron 402_1 of FIG. 4) receives a notification that its neighbor (e.g., the neuron 402_2) has fired a spike, the Neighbor Activity Trace (NAT) variable of the neuron 402_1 may be incremented by a certain amount, as illustrated by increments at times t1, t2, t3, denoted by arrows 504, 506, 508 in FIG. 5. The NAT variable may be configured to decrease with time, as shown by the trace 500 in FIG. 5. In one implementation, the NAT increment may be set to +1.0, and the decay interval may be configured to comprise 20 milliseconds (ms).

When the NAT trace is below a prescribed threshold (or otherwise meets a specified criterion), denoted by broken line 502 in FIG. 5, the associated neighboring neuron activity is considered "low", and the NAT sub-threshold STDP adjustment may be performed in accordance with any applicable mechanism, such as for example rule depicted by the curve 510 in FIG. 5. The sub-threshold plasticity rules corresponds to a low or 'old' neighbor activity (i.e., the neuron responses that occurred sometime in the past), and the SDTP adjustment may comprise potentiation and depression portions, as illustrated by positive and negative weight adjustment Δw depicted by the line 510 in FIG. 5.

However, when the NAT trace is above the aforementioned threshold, the associated neighboring neuron activity is considered "recent", and the NAT super-threshold STDP adjustment may be performed in accordance with a different mechanism, such as for example as depicted by the curves 520, 522 in FIG. 5. The super-threshold plasticity rules corresponds to a high or recent neighbor activity, and the SDTP adjustment comprises only depression portions, as illustrated by negative weight adjustment Δw depicted by the line 520 in FIG. 5 when Δt>0, and zero otherwise, depicted by the curve 522 in FIG. 5.

In one implementation, such as that illustrated in FIG. 5, the NAT threshold 502 may be configured at a value of 0.36 (~1/e), corresponding to the value that an exponential decay with time constant τ will pass in τ steps (if that value at time 0 is 1). When the NAT of the neuron is in the super-threshold state:

The pre-synaptic rule (i.e., when the spike of the pre-synaptic neuron arrives after the post-synaptic neuron generated its spike, i.e., Δt='time of post-synaptic spike'−'arrival time of pre-synaptic spike' is negative) depicted by the line 522 in FIG. 5 configured Δw=0.0; and the post-synaptic rule (i.e., when the spike of the pre-synaptic neuron arrives before the post-synaptic spike and, therefore, Δt is positive, depicted by the curve 520 in FIG. 5) becomes Δw(Δt)=A*NAT(Δt), where A is negative depression parameter, and NAT(Δt) is the value of the neighbor activity trace at the time the neuron generates response and the post-synaptic rule is applied.

Figure 3:
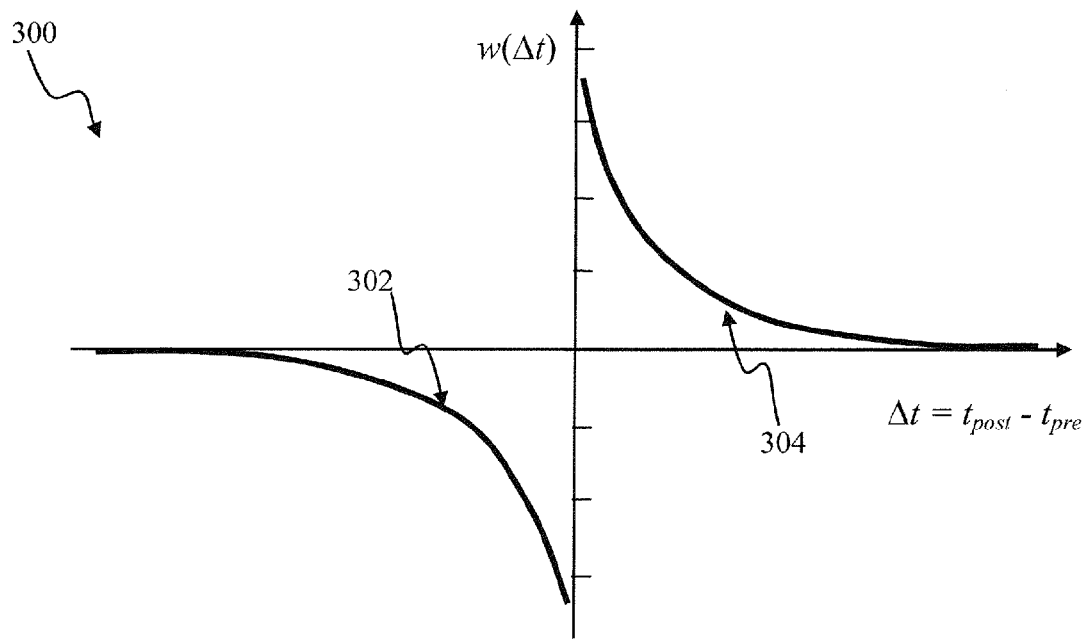
FIG. 3 is a plot depicting spike time dependent plasticity (STDP) spike timing in the spiking network of FIG. 1.

In one implementation, the depression parameter (A) may be set to a constant value, such as, for example −0.04, or a constant value±some random jitter. In some implementations, the parameter A may be determined using a monotonically increasing or decreasing function of Δt. Parameter A may also be determined using any arbitrary function of Δt that produces a negative output. As yet another option, the parameter A may be determined using any arbitrary STDP curve (e.g., the curve 510 in FIG. 5, or that in FIG. 3.) that in some implementations may be weighted by a factor W<1.

In some implementations, the neighbor activity may be propagated by a specialized set of connections that are referred to as an Event_Counter_Synapse. The Event_Counter_Synapse may increment the NAT values for neighboring neurons when a particular neuron fires. In some implementations, such specialized connections may be spatially localized. In some implementations, such specialized connections may be implemented in an all-to-all mapping.

It will be appreciated by those skilled in the arts that other sub-threshold plasticity curves (or yet other types of relationships) may be used with the approach of the disclosure, including for example non-symmetric rules (e.g., as described in co-pending and co-owned U.S. patent application Ser. No. 13/465,924, entitled "SPIKING NEURAL NETWORK FEEDBACK APPARATUS AND METHODS", incorporated supra). Furthermore, other super-threshold plasticity curves and/or other types of relationships may be used with the approach of the disclosure, including for example "slight" potentiation—i.e., configuration of the pre-synaptic update (e.g., the curve 522 in FIG. 5) with an amplitude that is lower than the depression of the post-synaptic update (e.g., the curve 520 in FIG. 5).

In some implementations, a mechanism configured to track age (i.e., elapsed time) of the neighbor post-synaptic activity may be used with (or in place of) the NAT parameter described above. For example, a digital counter associated with the neuron may be set to a reference value (zero or otherwise) every time an indication of neighbor post-synaptic activity is received. The counter may then be incremented (or decremented) during neuron operation. Before performing synaptic updates, the counter current value, indicating, inter alia, the age of neighbor post-synaptic activity, is evaluated and an STDP rule (e.g., the rule 510 or 520) is selected accordingly.

In some implementations, an analog counter (e.g., a capacitive circuit) may be used in order to trace neighbor activity age. The times of the spikes of neighboring neurons relative to a clock or some measure of simulation time may also be stored in the neuron. These times may be stored in a queue, array, list, or other data structure and processed when the neuron fires spikes to determine which STDP rule will be applied.

Figure 6A:
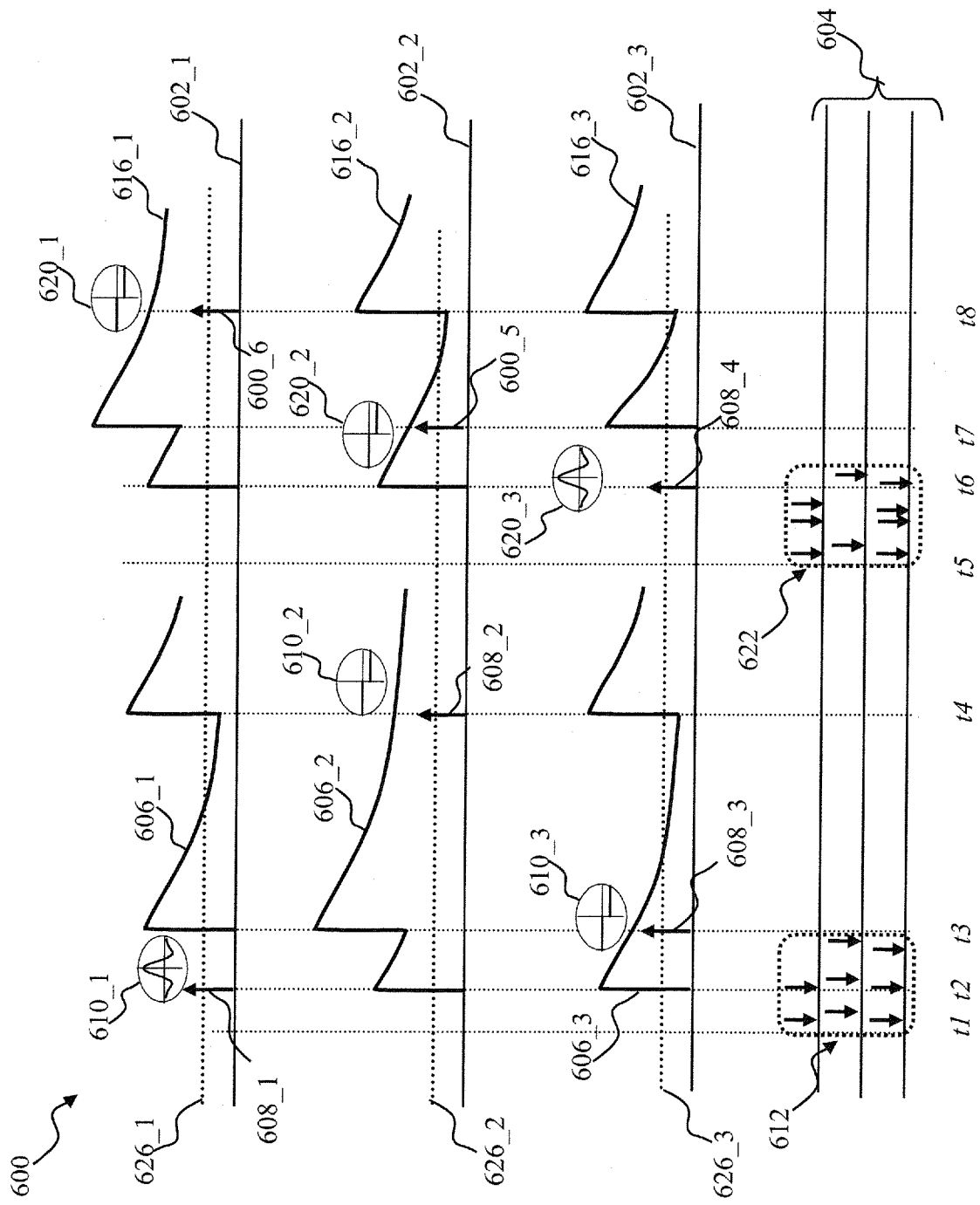
FIG. 6A is a graphical illustration of a heterosynaptic update mechanism in accordance with one implementation.
Figure 6B:
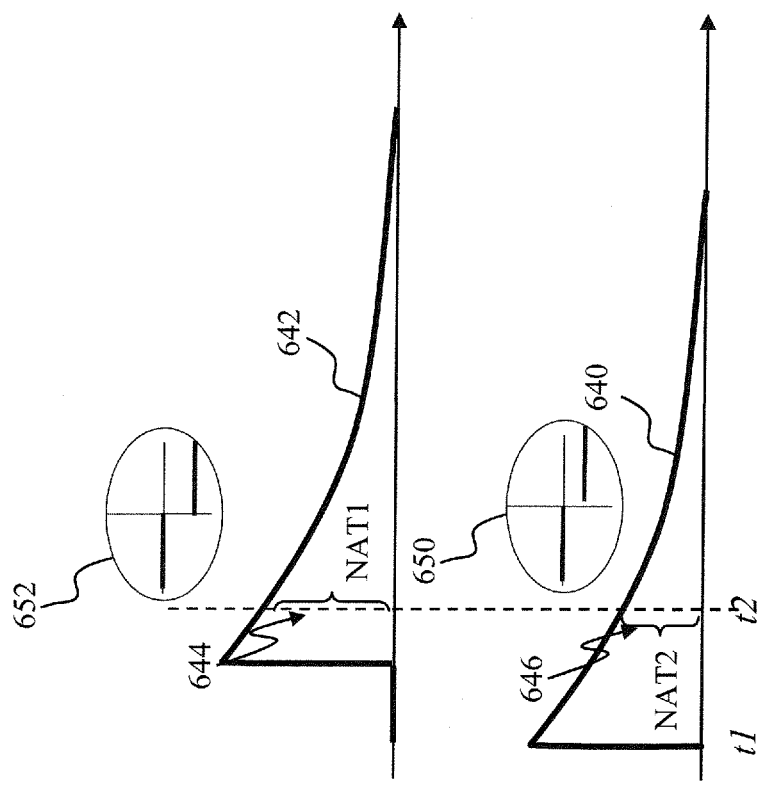
FIG. 6B is a graphical illustration of a NAT-dependent heterosynaptic update mechanism in accordance with one or more implementations of the invention.

Referring now to FIGS. 6A-6B, exemplary implementations of heterosynaptic plasticity, configured to produce receptive field diversity and improve feature detection capabilities of a neural network configured to process sensory input (e.g., the network 400 of FIG. 4), are shown and described. In some implementations, the neurons 402 of the network may be configured to receive input 404 from the same set of input elements 408. The input elements 408 may comprise for example neuroretina RGCs, or an image received from an image sensor (such as a CCD or a CMOS sensor device), or one downloaded from a file, such as a stream of two-dimensional matrices of red green blue RGB values (e.g., refreshed at a 24 Hz or other suitable frame rate). It will be appreciated by those skilled in the art given this disclosure that the above-referenced image parameters are merely exemplary, and many other image representations (e.g., bitmap, luminance-chrominance (YUV, YCbCr), cyan-magenta-yellow and key (CMYK), grayscale, etc.) are equally applicable to and useful with the present invention. Furthermore, data frames corresponding to other (non-visual) signal modalities such as sonograms, IR, radar or tomography images are equally compatible with the embodiment of FIG. 6. Input elements 408 may also comprise spiking outputs of another layer or layers of neurons responding to an image or data frame or sequence.

The traces 604 in FIG. 6A denote inputs to neurons 402 form the elements 408, while the traces 602_1, 602_2, 602_3 present post-synaptic activity curves 606 that denote the Neighbor Activity Trace (NAT) of the neurons 402_1, 402_2, 402_3, respectively. At times t1, t5, the neurons 402 may receive input pulses, illustrated by the pulse group 612 in FIG. 6A. At time t2≥t1, the neuron 402_1 may generate post-synaptic response, indicated by the pulse 608_1 in FIG. 6A. Accordingly, the NAT parameters of the neurons 402_2, 402_3 are incremented as illustrated by the step-up increase of traces 606_2, 606_3, respectively.

At time t3≥t2, the neuron 402_3 may generate a response, indicated by the pulse 608_3 in FIG. 6A. Accordingly, the NAT parameters of the neurons 402_1, 402_3 are incremented as illustrated by the step-up increase at time t3 of traces 606_1, 606_2, respectively.

At time t4≥t3 the neuron 402_2 may generate a post-synaptic response, indicated by the pulse 608_2 in FIG. 6A. Accordingly, the NAT parameters of the neurons 402_2, 402_3 are incremented as illustrated by the step-up increase at time t4 of traces 606_2, 606_3, respectively.

In some implementations, heterosynaptic adjustment of synaptic connection efficacy (e.g., the connections 404 in FIG. 4) may be effectuated when the neuron generates a post-synaptic response (e.g., times t2, t3, t4 in FIG. 6A), referred to as the post-synaptic adjustment. At these instances, the level of the NAT parameter (the curves 606 in FIG. 6A) for the respective neuron is compared to the NAT threshold 626. In some implementations, the threshold 626_1, 626_2, 626_3 may comprise the same value, or the threshold 626_1, 626_2, 626_3 may be selected as different values. When the NAT<NAT_Threshold, the standard plasticity rule may be used to adjust the input connections that provided relevant pre-synaptic input (e.g., the pulses within the pulse group 612). In some implementations, the standard STDP adjustment may comprise the rule depicted by the line 510 in FIG. 5 (and graphically illustrated by the curves denoted 610_1, 620_3 in FIG. 6A). When the NAT≥NAT_Threshold, at the time the post-synaptic response is generated (indicating recent neighbor activity), an alternate plasticity rule may be employed. This alternate STDP adjustment rule may comprise for instance the rule depicted by the line 520 in FIG. 5 (and graphically illustrated by the curve within the circles 610_2, 610_3, 620_1, 6202 in FIG. 6A). It will be appreciated that the terms "standard" and "alternate" as used in the present context are intended as general terms for purposes of illustration only, and can encompass literally any two or more weight adjustment rules.

In some implementations, the heterosynaptic connection adjustment of synaptic connections 404 is performed every time pre-synaptic input (e.g., the spikes within the spike groups 612, 614 in FIG. 6A) is received by the neuron, referred to herein as the pre-synaptic adjustment. Similar to the post-synaptic adjustment described above, the pre-synaptic plasticity may be effectuated using for instance the heterosynaptic mechanism comprising adjustment depicted by the rules 610, 620 in FIG. 6A.

In one or more implementations, the pre-synaptic adjustments may be combined with the post-synaptic adjustment when the post-synaptic response occurs, as described for example in co-owned and co-pending U.S. patent application Ser. No. 13/239,255 filed Sep. 21, 2011, entitled "APPARATUS AND METHODS FOR SYNAPTIC UPDATE IN A PULSE-CODED NETWORK", incorporated herein by reference in its entirety. As described therein, in one or more exemplary implementations, one or more connection updates are accumulated over a period of time in order to improve, inter alia, memory access efficiency; and the updates are updated in bulk when post-synaptic responses are generated, thereby effectuating the post-synaptic update.

The NAT curves 606 shown in FIG. 6A enable the first post-synaptic output of the neuron 402_1 (i.e., the pulse 608_1) to modify the STDP curves and, hence, learning of the neurons 402_2, 402_3, as illustrated by the plasticity curves 606_2, 606_3 in FIG. 6A.

It will be appreciated by those skilled in the arts that the post-synaptic response order illustrated by the pulses 608_1, 608_2, 608_3 in FIG. 6A comprises but one exemplary implementation, and the neuron response order may change as neurons process different inputs. As illustrated by the neuronal responses to the input pulse group 622 in FIG. 6A, the order of neuronal responses at times t6, t7, t8 may change, as shown by the post-synaptic pulses 608_4, 608_5, 608_6. The first post-synaptic response of neuron 402_3 (shown by the pulse 608_4 at time t6) may cause modification of the STDP curves of neurons 402_1, 402_2, as illustrated by the changes in the neighbor activity traces 616_1, 616_2 at time t6 in FIG. 6A. Similarly, the post-synaptic responses shown by the pulses 600_5, 600_6 at times t7, t8, respectively, may cause modification of the neighbor activity traces 616_1, 616_2, 616_3 at times t7, t8, respectively. The input pulse group 622, corresponds to the neuron 402_3 using regular STDP rule (shown by the circle 620_3 in FIG. 6A), while the neurons 403_1, 402_2 use alternate STDP rule (shown by the circles 620_1, 620_2, respectively, in FIG. 6A).

Neuronal responses and plasticity adjustments of implementations of FIGS. 6A-6B reduce the probability of (or suppress generation of) post-synaptic responses by neurons 602_2, 602_3 for the pre-synaptic input pulse group 612, thereby preventing the neurons 4022, 402_3 from learning feature(s) that may be associated with the input pulse group 612. Similarly, the post-synaptic response of the neuron 402_3 to the input pulses group 622 may reduce the probability of (or suppress generation of) post-synaptic responses by neurons 402_1, 402_2 (associated with the traces 602_1, 602_2 in FIG. 6A) for the pre-synaptic input pulse group 622, thereby preventing the neurons 402_1, 402_2 from learning feature(s) that may be associated with the input pulse group 622.

The heterosynaptic mechanism illustrated in FIG. 6A may suppress the neuron 402_2 from learning from either input group 612, 622 thereby advantageously guiding the neuron to learn a different feature or feature set, and hence enhancing receptive field diversity. In some implementations, learning may be reduced, and in others, learning may be inverted for neuron 402_2, that is, it may actively "unlearn" stimuli for which other neurons have responded earlier.

It is noteworthy that in the heterosynaptic plasticity implementation of FIG. 6A, the alternate plasticity rules 610_2, 610_3, 630_1, 620_2, comprise the same weight adjustment magnitudes as one another. In one or more heterosynaptic plasticity implementations, such as that illustrated in FIG. 6B), the weight adjustment of the alternate STDP rule, effectuated at different time instances, may depend on the value of the NAT parameter at the time the plasticity adjustment is performed. By way of illustration, the plasticity rule 652 at time t1 shown in FIG. 6B comprises a greater adjustment magnitude as compared to the plasticity rule 650, due to lower value 644 of NAT1 parameter on trace 640, compared to the value 646 of NAT2 parameter on trace 640 at time t1 in FIG. 6B.

In some implementations (not shown) the NAT trace maximum value may be limited to a preset or dynamically determined value so as to, inter cilia, better manage post-synaptic bursting activity by a single neuron.

In some implementations (not shown), the heterosynaptic plasticity mechanism described herein may be aided by a slow up-drift (i.e., an increase over time) of synaptic connections (such as by adjustment of connection weights) so that the suppressed neuron (e.g., the neuron 402_2, associated with the trace 602_2 in FIG. 6A) may generate stochastic post-synaptic response(s) for a different pre-synaptic input, prior to the active neurons (e.g., the neuron 402_1, 402_3, associated with the traces 602_1, 602_3 in FIG. 6A). This up-drift mechanism may aid inactive (or suppressed) neurons to learn different feature(s) compared to the active neurons. Over time, heterosynaptic plasticity, aided by the slow up-drift, may aid neurons to converge to different input feature(s), thereby increasing receptive field diversity.

Figure 6C:
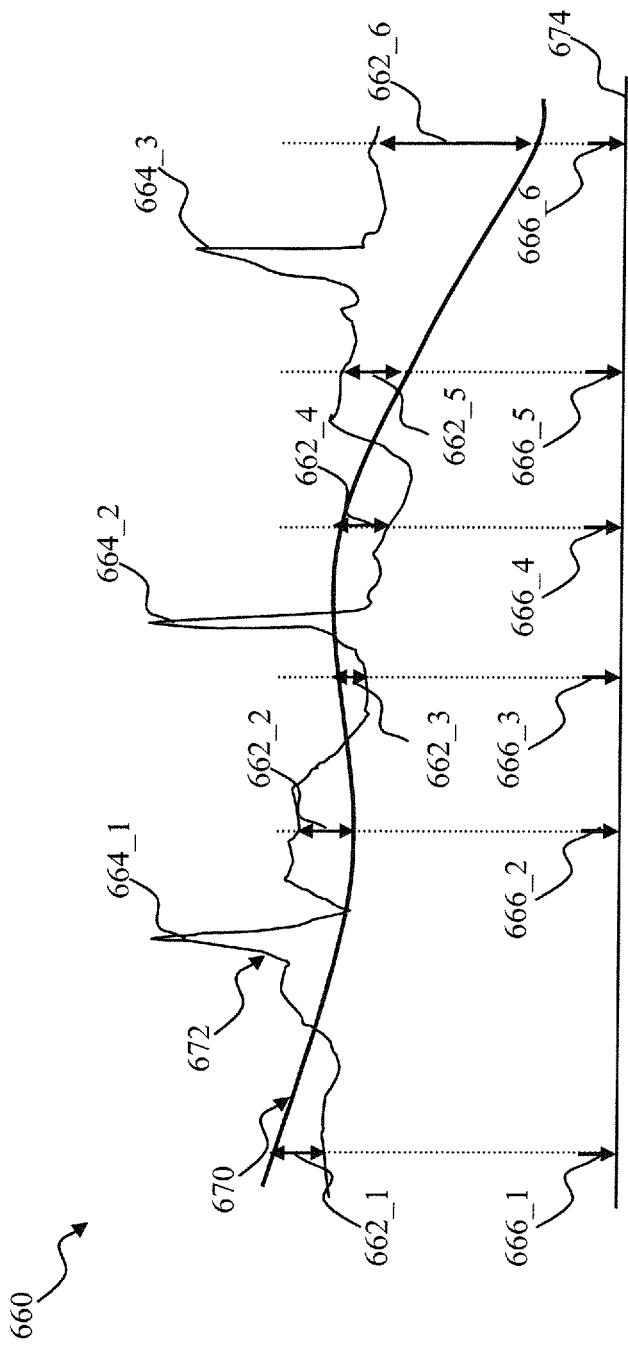
FIG. 6C is a graphical illustration of a heterosynaptic update mechanism that is based on a neuron state parameter, in accordance with one or more implementations.

In some implementations, the STDP adjustment may be modulated in the manner depicted and described with respect to FIG. 6C below. In FIG. 6B, the trace 674 depicts neuron input (pre-synaptic) activity that may comprise a plurality of input spikes 666. The output of the neuron is depicted by the trace 664 that may correspond, in some implementations, to a membrane voltage and/or another state parameter describing neuron dynamics. The neuron may generate one or more responses, as indicated by the spikes 664 in the trace 670 in FIG. 6C.

In one or more such implementations, the modulation may be effectuated via a multiplication by an additional factor. In some of these implementations, the value of this factor may be determined based on an intrinsic variable of the neuron (e.g., the membrane voltage q1 672 in FIG. 6C). In others of these implementations, another parameter (referred to as q2) and depicted by the trace 670 in FIG. 6C. Multiple such variables and/or a combination thereof may be used. These additional parameters may be set and/or modulated by the neighbor activity, such as by the neighbor activity trace as described herein. The STDP rule used to adjust input connections into the neuron of FIG. 6C may comprise the rule 300 of FIG. 3. This STDP rule may be modulated by, for example, a difference between the instantaneous values of two or more additional parameters, selected at times of the input spikes (e.g., the spikes 666 in FIG. 6C). In one implementation, these adjustments may be determined based on differences 662 between the neuron membrane voltage 672 and the additional parameter 670. By way of illustration, the STDP rule modification in response to the input spike 666_1 may be effectuated based on the difference 662_1.

In some implementations, the parameter q2 670 may comprise a target value for the state parameter q1. In some implementations, when the value of q2>q1 at the time of the input spike occurrence. For example, the differences 662_1, 662_3, 662_4, in FIG. 6C) the LTP portion of an STDP rule (such as curve 304 in FIG. 3) may be strengthened and the LDT portion (such as 302 in FIG. 3) may be weakened relative to the regular rule state (e.g., the rule depicted in FIG. 3).

Conversely, in one or more implementations, when the value of q2<q1 at the time of the input spike occurrence. For example, the differences 662_2, 662_5, 662_6 in FIG. 6C) the LTP portion of an STDP rule (such as curve 304 in FIG. 3) may be weakened and the LDD portion (such as 304 in FIG. 3) may be strengthened (relative to the regular rule state (e.g., the rule depicted in FIG. 3)). The STDP modifications that are based on the parameters q1, q2 may strengthen (or weaken) the respective connection(s) by a greater amount, compared to the regular rule, thereby bring the state parameter q1 average closer the desired state q2.

In some implementations, the parameter 670 may be decremented or otherwise decreased by an increase in the neighbor activity, such as an increase in neighbor activity trace (NAT). In one or more implementations, the parameter 670 may be determined based on NAT and one or more neuron state variables (e.g., the membrane voltage 672 in FIG. 6C). In one or more implementations, when the parameter q2 is decreased as a result of an increase in NAT, the neuron may learn at a lower rate. In some implementations, such decrease may further cause the neuron to 'unlearn' the input for which NAT is high, thereby preventing duplicate responses of the network to the same feature(s) already covered by neighboring neuron(s).

In some implementations, increased q2 (as a result of, for example, little or no NAT) may increase the neuron learning rate due to, for example, stronger LTP. On one or more implementations, this may aid the neuron to learn feature(s) to which the neighboring neurons have not yet responded and/or have produced weak responses. In some implementations, the neurons implementing the rule STDP modification that are based on the parameters q1, q2, such as, for example those described above, may produce greater diversity of feature responses or receptive fields.

Exemplary Methods

Exemplary implementations of the plasticity adjustment methodology described herein advantageously enable, inter alia, development of diversified neuronal receptive fields, and elimination of response duplicates, thereby streamlining network operation.

Neuronal Response Diversification Via Heterosynaptic Plasticity

Figure 7:
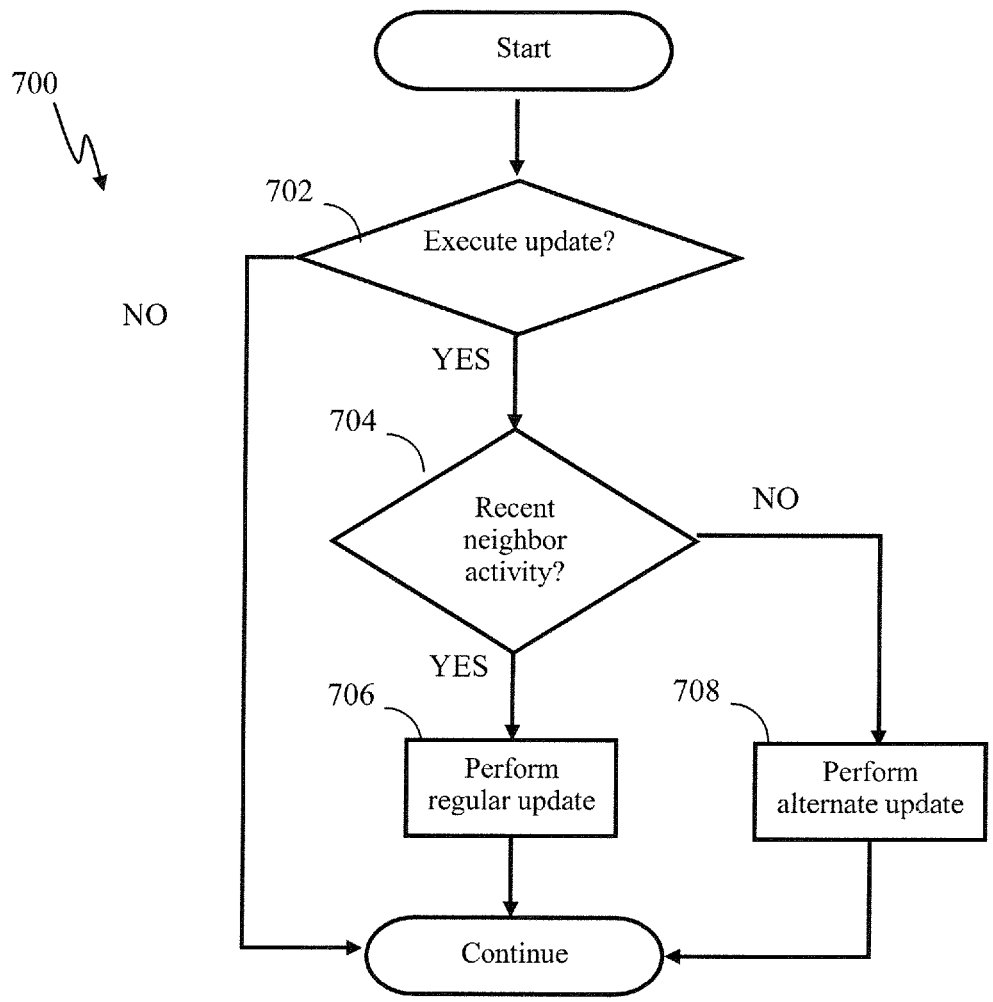
FIG. 7 is a logical flow diagram illustrating a generalized heterosynaptic plasticity update, in accordance with one or more implementations.
Figure 7A:
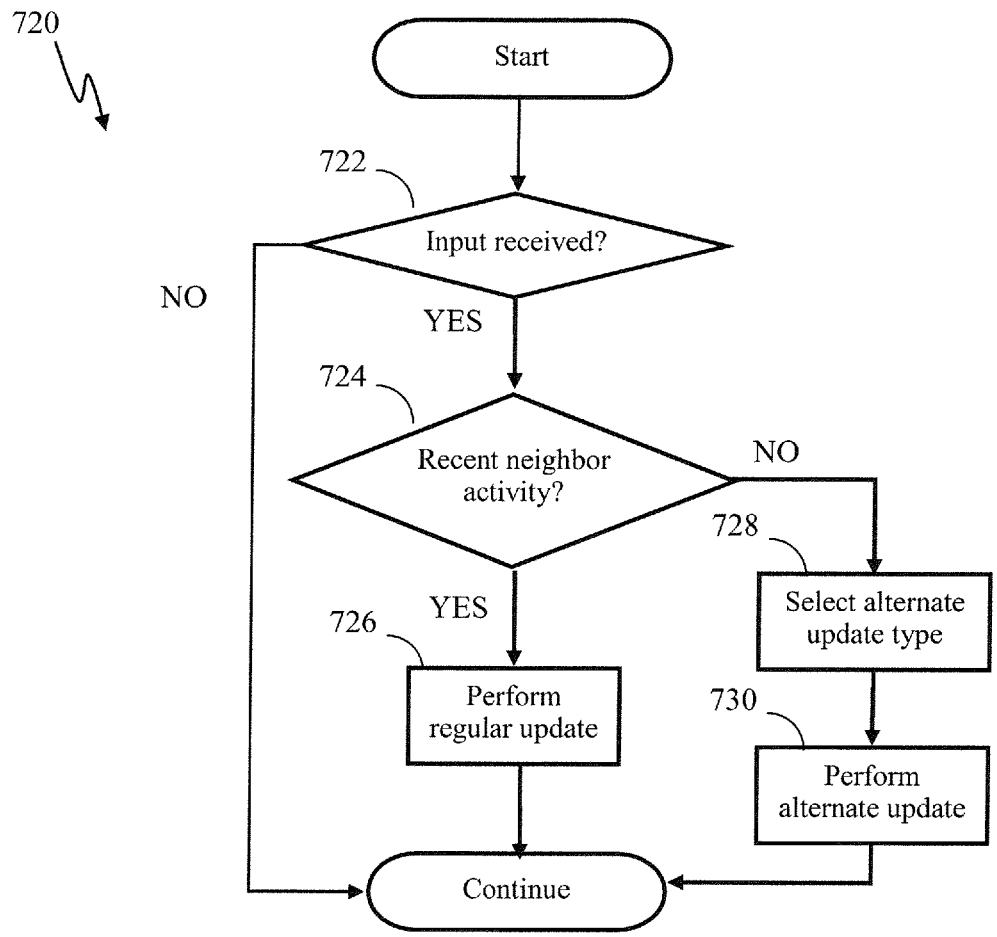
FIG. 7A is a logical flow diagram illustrating a heterosynaptic plasticity update based on the pre-synaptic input, in accordance with one or more implementations.
Figure 8:
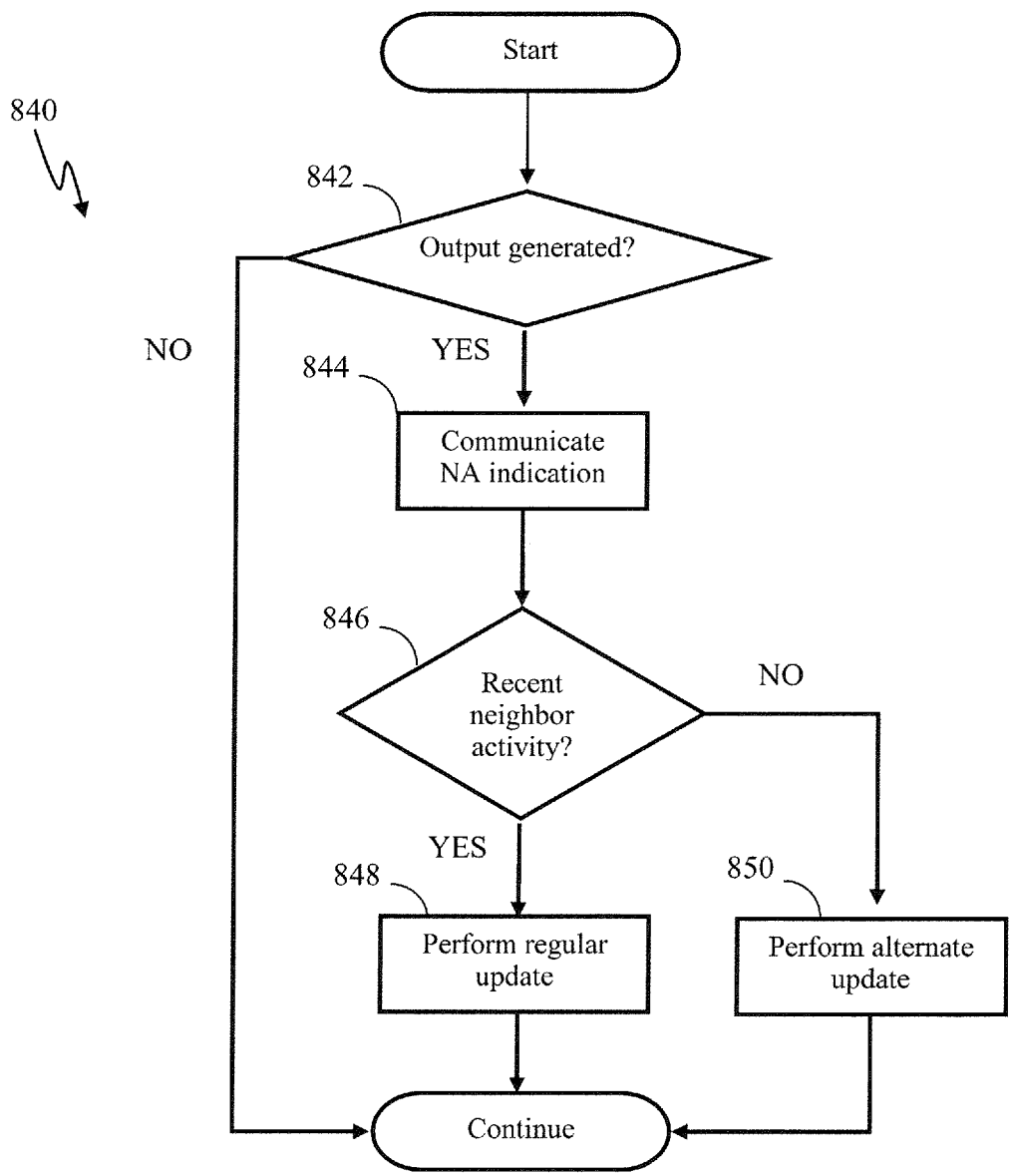
FIG. 8 is a logical flow diagram illustrating a heterosynaptic plasticity update based on post-synaptic response, in accordance with one or more implementations.

Referring now to FIGS. 7A-8, exemplary implementations of heterosynaptic plasticity-based methods according to the disclosure are described. In some implementations, the methods of FIG. 7A-8 may be used, for example, for operating the neurons 402 of FIG. 4. Moreover, the methods of FIG. 7-8 may be implemented in a synaptic connection (e.g., the connection 404 of FIG. 4). The methods of FIG. 7A-9 may also be implemented in sensory processing in a spiking neuronal network, such as for example the network 400 of FIG. 4, and the sensory processing apparatus described with respect to FIG. 10, infra, thereby advantageously aiding, inter alia, development of diversified receptive fields useful when processing sensory input.

Returning now to FIG. 7, at step 702 of the method 700, a check is performed whether an update is to be executed. In some implementations, the update may correspond to the exemplary pre-synaptic update described in detail with respect to FIG. 7A herein, while in some other implementations, the update may correspond to the post-synaptic update described in detail with respect to FIG. 8. The foregoing may be combined in a single technique or apparatus as well.

Moreover, in some implementations, the update may correspond to update of neuronal parameters that may be configured to effectuate effect of synaptic plasticity.

When the update is to be performed, the method 700 proceeds to step 704, where recent neighbor activity is evaluated using any of the applicable methodologies described supra. In some implementations, the neighbor activity age (e.g., the time counter) may be evaluated; the NAT parameter may be used as well (whether alone or in combination with age). Yet other parameters useful for evaluating neighbor neuron activity may be used consistent with the method 700 as well.

When no recent neighbor activity is present (e.g., the NAT<NAT_Threshold as described with respect to FIGS. 5-6 above) the method proceeds to step 706 where a "regular" update (e.g., the rule depicted by the curve 510 in FIG. 5) is executed.

When the neighbor activity is recent (e.g., the NAT≥NAT_Threshold as described with respect to FIGS. 5-6 above) the method proceeds to step 708, where an alternate update (e.g., the rule depicted by the curve 520 in FIG. 5) is executed.

FIG. 7A illustrates an exemplary pre-synaptic update comprising a heterosynaptic plasticity mechanism in accordance with one or more implementations of the invention. At step 722 of the method 720, a determination is made if input has been received by the neuron. When the determination indicates that an input has been received, the method proceeds to step 724, wherein recent neighbor activity is evaluated using any of the applicable methodologies described supra. In some implementations, the neighbor activity age (e.g., the time counter), the NAT parameter, and/or yet other parameters may be used in this evaluation as indicated above.

When no recent neighbor activity is present (e.g., the NAT<NAT_Threshold as described with respect to FIGS. 5-6 above) the method proceeds to step 726, wherein regular pre-synaptic update (e.g., the rule depicted by the curve 510 in FIG. 5) is executed.

When the neighbor activity is recent (e.g., the NAT≥NAT_Threshold as described with respect to FIGS. 5-6 above) the method proceeds to step 728, wherein a specific implementation of an alternate pre-synaptic update (e.g., the rule depicted by the curve 520 in FIG. 5) is selected. In some implementations, this selection may be effectuated based on an event (e.g., a timer, an external flag, number of input pulses, etc.). In one or more implementations, the alternate update selection may be effectuated based on network operating parameters. For example the number of distinct receptive fields, number of neurons per receptive field, weight time-evolution (e.g., weight change rate), convergence speed, statistics of an event (e.g., a timer, an external flag, number of input pulses, etc.) may be used.

At step 730, the alternate pre-synaptic update (e.g., the rule depicted by the curve 520 in FIG. 5) is executed.

FIG. 8 illustrates an exemplary post-synaptic update comprising a heterosynaptic plasticity mechanism in accordance with one or more implementations. At step 842 of the method 840, a determination is made if post-synaptic response has been generated by the neuron. When the determination indicates that a response has been generated, the method proceeds to step 844, wherein an indication of post-synaptic activity is communicated. In some implementations, the indication may be communicated via a message broadcast, or the indication may be communicated using a dedicated or shared queue(s). Various other post-synaptic activity notification methodologies may be used with the heterosynaptic mechanism of the disclosure, such as, for example, shared memory (e.g., physical or virtual), dedicated or shared bus (e.g., as described with respect to FIGS. 11A-11D below), point-to-point communication links, etc.

At step 846, recent neighbor activity is evaluated using any of the applicable methodologies described supra. As above, in some implementations, the neighbor activity age (e.g., the time counter), the NAT parameter, or yet other parameters may be used for this evaluation.

When no recent neighbor activity is present (e.g., the NAT<NAT_Threshold as described with respect to FIGS. 5-6 above) the method proceeds to step 848, wherein regular post-synaptic update (e.g., the rule depicted by the curve 510 in FIG. 5) is executed.

When the neighbor activity is recent (e.g., the NAT≥NAT_Threshold as described with respect to FIGS. 5-6 above) the method proceeds to step 850, wherein an alternate pre-synaptic update (e.g., the rule depicted by the curve 520 in FIG. 5) is executed.

In one or more exemplary implementations of the foregoing method(s), the update may be performed according to methodology described in U.S. patent application Ser. No. 13/152,105 entitled "APPARATUS AND METHODS FOR TEMPORALLY PROXIMATE OBJECT RECOGNITION", incorporated by reference, supra). For instance, the neuron may be characterized by (i) a current neuronal state, and (ii) a threshold state (also referred to as the firing state). When the feed-forward input is sufficient to move the current neuronal state into the firing state (super-threshold current state) as a result of the neuronal state update, a post-synaptic neuronal response (spike; e.g., pulse 608-1 in FIG. 6) may be generated by the neuron. When the feed-forward input is not sufficient, the current state of the neuron (referred to as the sub-threshold state) is maintained, and no post-synaptic neuronal response (spike) occurs.

In some implementations, the update may comprise execution of software instructions by a processor, or hardware instructions by a specialized integrated circuit (e.g., ASIC).

The update may comprise operating an analog circuit and evaluating a characteristic (e.g., voltage) versus a threshold value. In one such implementation, the circuit may comprise an adaptive synapse circuitry, comprising for example a transistor and/or fixed or variable operational transconductance amplifier. The transistor gate (i.e. the conductance between the source and drain terminals of the transistor) may be adjusted thereby effectuating plasticity mechanism described above. Various other particular implementations for effecting updates will be recognized by those of ordinary skill given the present disclosure.

In some implementations, during neuronal state update, the efficacy of synaptic connections delivering feed-forward input to the neuron is updated according to, for example, the methodology described in co-owned and co-pending U.S. patent application Ser. No. 13/239,255 filed Sep. 21, 2011, entitled "APPARATUS AND METHODS FOR SYNAPTIC UPDATE IN A PULSE-CODED NETWORK", incorporated herein by reference in its entirety. As described therein, in one or more exemplary implementations, one or more connection updates are accumulated over a period of time and updated in bulk to improve, inter alia, memory access efficiency.

Figure 9:
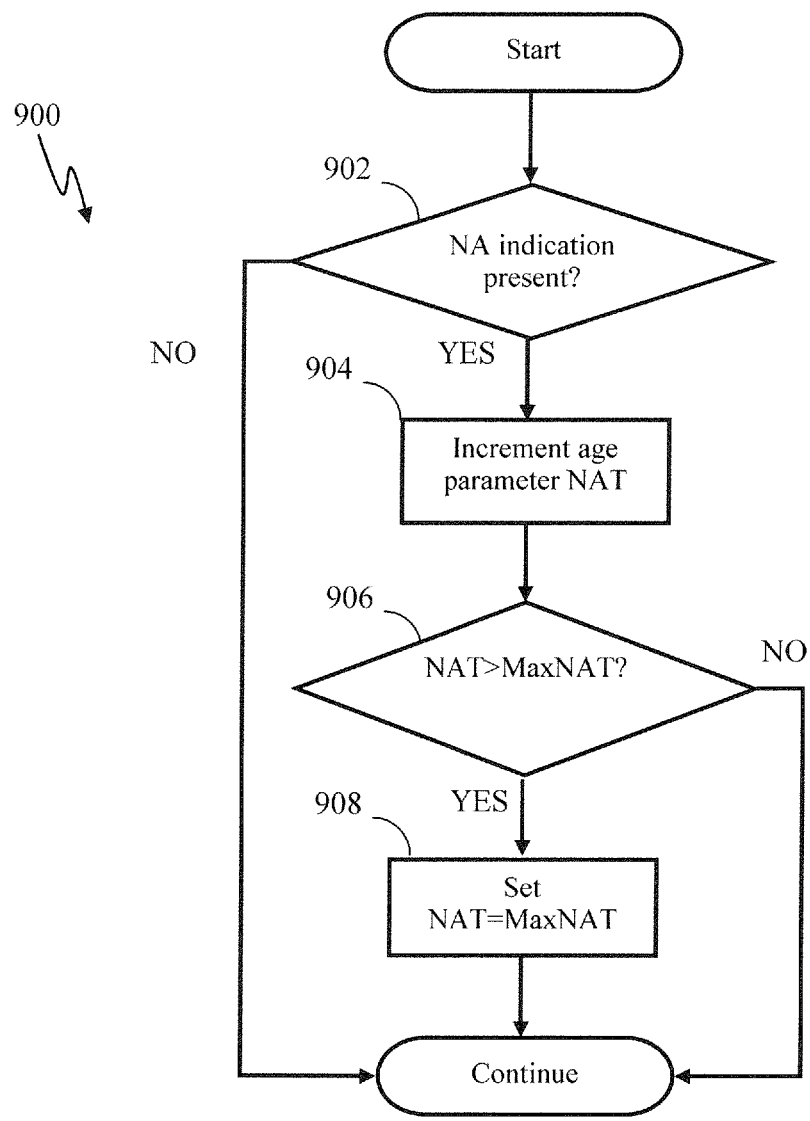
FIG. 9 is a logical flow diagram illustrating a neighbor activity trace determination for use with, e.g., a heterosynaptic plasticity mechanism, in accordance with one or more implementations.

Referring to FIG. 9, one implementation of a neighbor activity tracking methodology is described. At step 902 of the method 900, a check is performed whether neighbor activity (NA) notification (e.g., the NA indication of step 844 of FIG. 8) is present. If the NA indication is present, a parameter configured to track NA age (e.g., the NAT described supra) is updated (e.g., incremented, as illustrated in FIG. 5) at step 904. At step 906, the incremented value of the age parameter is compared against the maximum allowed value (MaxNAT), or some other relevant criterion.

When the present values of the NA age parameter exceeds the MaxNAT, the NA age parameter is set to MaxNAT at step 9808.

Exemplary Apparatus

Various exemplary spiking network apparatus implementing one or more of the methods set forth herein (e.g., using the exemplary heterosynaptic plasticity mechanisms explained above) are now described with respect to FIGS. 10-11D.

Sensory Processing Apparatus

Figure 10:
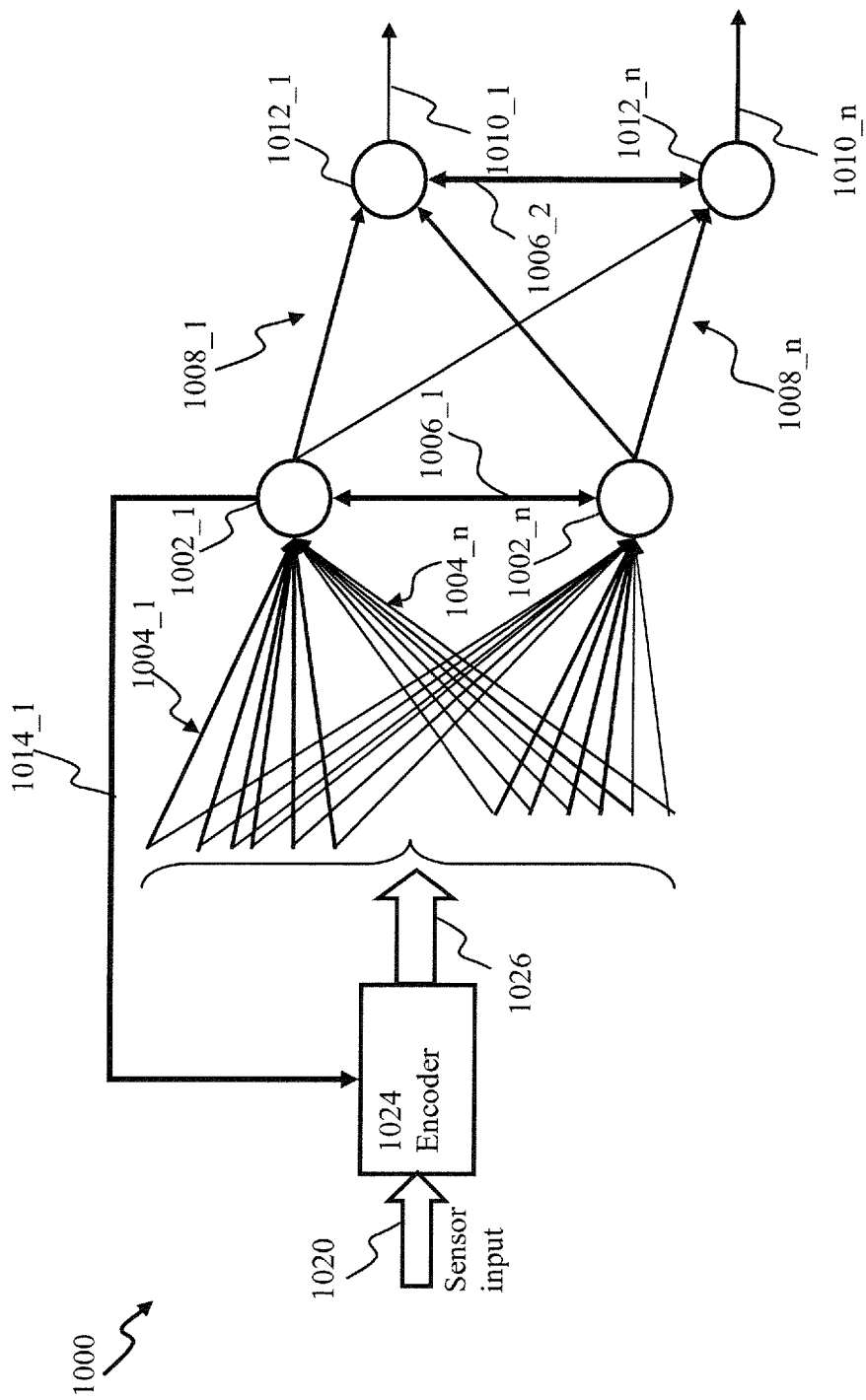
FIG. 10 is a block diagram illustrating a sensory processing apparatus configured to implement a heterosynaptic plasticity mechanism in accordance with one or more implementations.

One apparatus for processing of sensory information (e.g., visual, audio, somatosensory) using a spiking neural network (including one or more of the heterosynaptic plasticity mechanisms described herein) is shown in FIG. 10. The illustrated processing apparatus 1000 includes an input interface configured to receive an input sensory signal 1020. In some implementations, this sensory input comprises electromagnetic waves (e.g., visible light, IR, UV, etc.) entering an imaging sensor array (comprising RGCs, a charge coupled device (CCD), CMOS device, or an active-pixel sensor (APS)). The input signal in this case is a sequence of images (image frames) received from a CCD or CMOS camera via a receiver apparatus, or downloaded from a file. Alternatively, the image is a two-dimensional matrix of RGB values refreshed at a 24 Hz frame rate. It will be appreciated by those skilled in the art that the above image parameters and components are merely exemplary, and many other image representations (e.g., bitmap, CMYK, grayscale, etc.) and/or frame rates are equally useful with the present invention.

The apparatus 1000 may also include an encoder 1024 configured to transform (encode) the input signal so as to form an encoded signal 1026. In one variant, the encoded signal comprises a plurality of pulses (also referred to as a group of pulses) configured to model neuron behavior. The encoded signal 1026 may be communicated from the encoder 1024 via multiple connections (also referred to as transmission channels, communication channels, or synaptic connections) 1004 to one or more neuronal nodes (also referred to as the detectors) 1002.

In the implementation of FIG. 10, different detectors of the same hierarchical layer are denoted by an "_n" designator, such that e.g., the designator 1002_1 denotes the first detector of the layer 1002. Although only two detectors (1002_1, 1002_n) are shown in FIG. 10 for clarity, it is appreciated that the encoder can be coupled to any number of detector nodes that is compatible with the detection apparatus hardware and software limitations. Furthermore, a single detector node may be coupled to any practical number of encoders.

In one implementation, each of the detectors 1002_1, 1002_n contain logic (which may be implemented as a software code, hardware logic, or a combination of thereof) configured to recognize a predetermined pattern of pulses in the encoded signal 1004, using for example any of the mechanisms described in U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", each incorporated herein by reference in its entirety, to produce post-synaptic detection signals transmitted over communication channels 1008. In FIG. 10, the designators 1008_1, 1008_n denote output of the detectors 1002_1, 1002_n, respectively.

In one implementation, the detection signals are delivered to a next layer of the detectors 1012 (comprising detectors 1012_1, 1012_m, 1012_k) for recognition of complex object features and objects, similar to the exemplary configuration described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated herein by reference in its entirety. In this configuration, each subsequent layer of detectors is configured to receive signals from the previous detector layer, and to detect more complex features and objects (as compared to the features detected by the preceding detector layer). For example, a bank of edge detectors is followed by a bank of bar detectors, followed by a bank of corner detectors and so on, thereby enabling alphabet recognition by the apparatus.

Each of the detectors 1002 may output detection (post-synaptic) signals on communication channels 1008_1, 1008_n (with appropriate latency) that may propagate with different conduction delays to the detectors 1012. The detector cascade of the apparatus of FIG. 10 may contain any practical number of detector nodes and detector banks determined, inter alia, by the software/hardware resources of the detection apparatus and complexity of the objects being detected.

The sensory processing apparatus implementation illustrated in FIG. 10 may further comprise lateral connections 1006. In some variants, the connections 1006 are configured to communicate post-synaptic activity indications between neighboring neurons of the same hierarchy level, as illustrated by the connection 1006_1 in FIG. 10. In some variants, the neighboring neuron may comprise neurons having overlapping inputs (e.g., the inputs 1004_1, 1004_n in FIG. 10), so that the neurons may compete in order to not learn the same input features. In one or more implementations, the neighboring neurons may comprise spatially proximate neurons such as being disposed within a certain volume/area from one another on a 3-dimensional (3D) and or two-dimensional (2D) space.

The apparatus 1000 may also comprise feedback connections 1014, configured to communicate context information from detectors within one hierarchy layer to previous layers, as illustrated by the feedback connections 1014_1 in FIG. 10. In some implementations, the feedback connection 1014_2 is configured to provide feedback to the encoder 1024 thereby facilitating sensory input encoding, as described in detail in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra.

Computerized Neuromorphic System

Figure 11A:
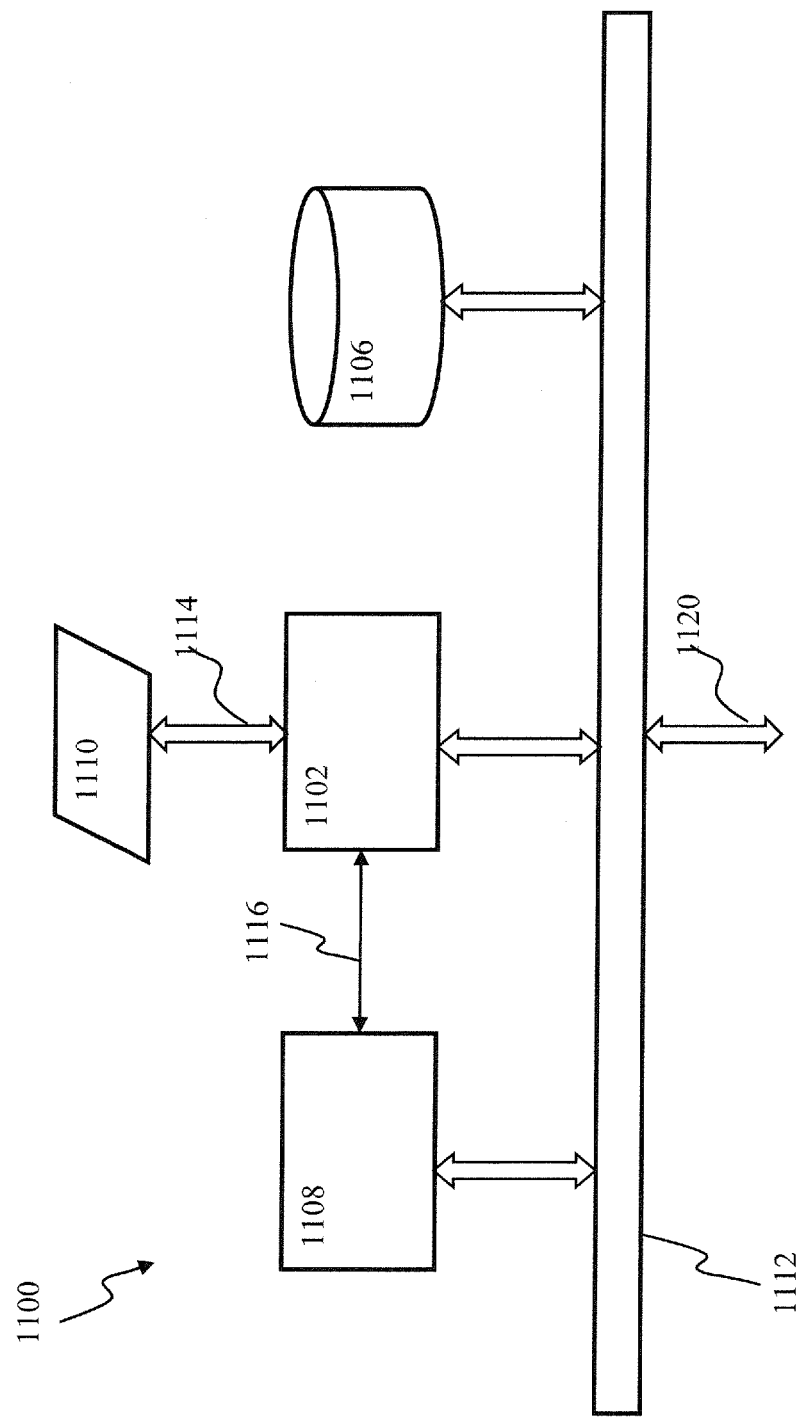
FIG. 11A is a block diagram illustrating a computerized system useful for, inter alia, implementing a heterosynaptic plasticity mechanism in a spiking network, in accordance with one or more implementations.

One particular implementation of the computerized neuromorphic processing system, adapted for operating a computerized spiking network (and implementing the exemplary heterosynaptic plasticity methodology described supra), is illustrated in FIG. 11A. The computerized system 1100 of FIG. 11A comprises an input interface 1110, such as for example an image sensor, a computerized spiking retina, an audio array, a touch-sensitive input device, etc. The input interface 1110 is coupled to the processing block (e.g., a single or multi-processor block) via the input communication interface 1114. The system 1100 further comprises a random access memory (RAM) 1108, configured to store neuronal states and connection parameters (e.g., weights 526 in FIG. 5), and to facilitate synaptic updates. In some implementations, synaptic updates are performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra.

In some implementations, the memory 1108 is coupled to the processor 1102 via a direct connection (memory bus) 1116. The memory 1108 may also be coupled to the processor 1102 via a high-speed processor bus 1112).

The system 1100 may further comprise a nonvolatile storage device 1106, comprising, inter alia, computer readable instructions configured to implement various aspects of spiking neuronal network operation (e.g., sensory input encoding, connection plasticity, operation model of neurons, etc.). The nonvolatile storage 1106 may be used for instance to store state information of the neurons and connections when, for example, saving/loading network state snapshot, or implementing context switching (e.g., saving current network configuration (comprising, inter alia, connection weights and update rules, neuronal states and learning rules, etc.) for later use, and loading of a previously stored network configuration.

In some implementations, the computerized apparatus 1100 is coupled to one or more external processing/storage/input devices via an I/O interface 1120, such as a computer I/O bus (PCI-E), wired (e.g., Ethernet) or wireless (e.g., Wi-Fi) network connection.

In another variant, the input/output interface comprises a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces are similarly applicable to embodiments of the invention including, for example, an LCD/LED monitor, touch-screen input and display device, speech input device, stylus, light pen, trackball, end the likes.

Figure 11B:
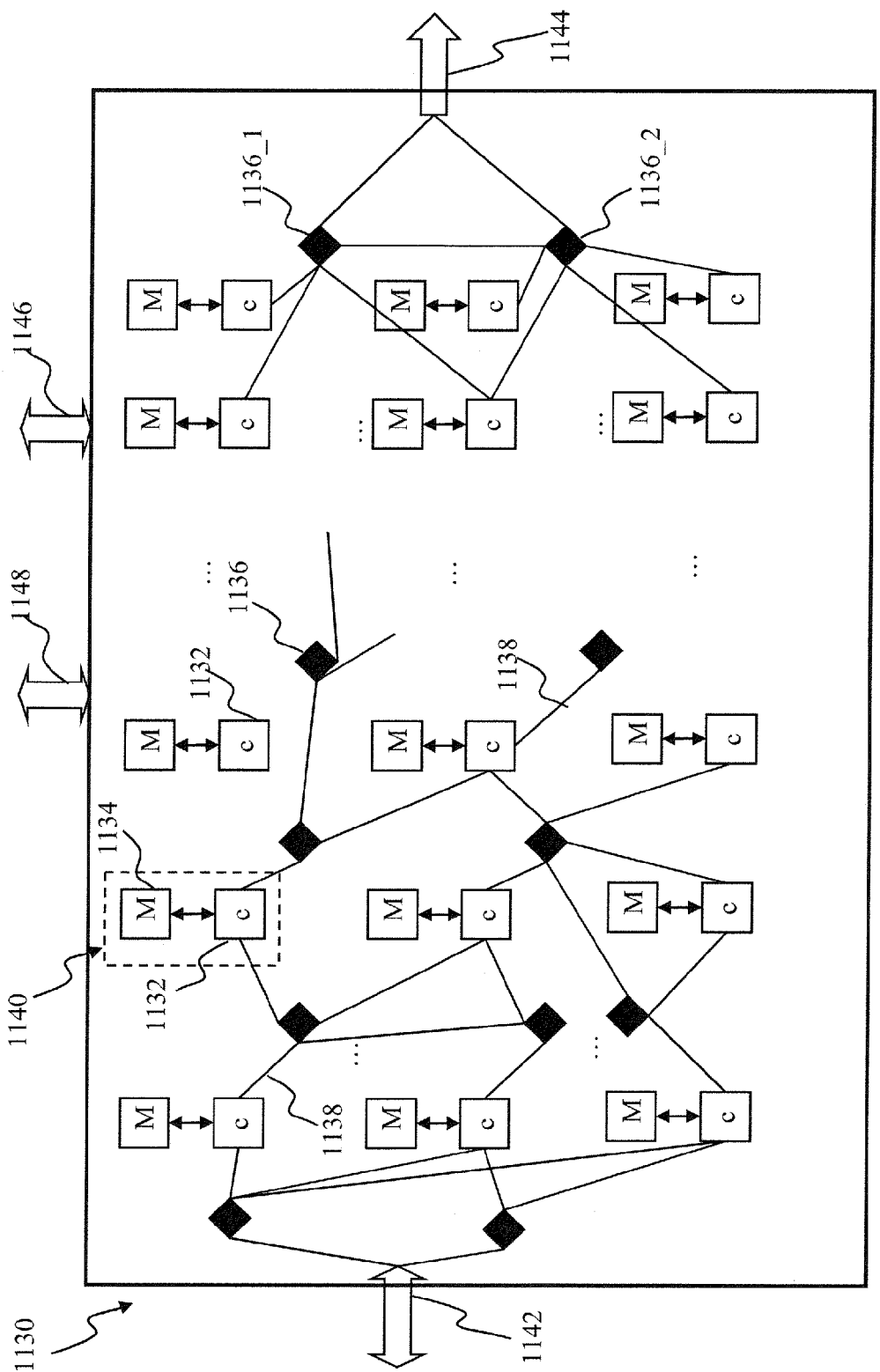
FIG. 11B is a block diagram illustrating a neuromorphic computerized system in accordance with inter alia, a heterosynaptic plasticity mechanism in a spiking network, in accordance with one or more implementations.

Referring now to FIG. 11B, one implementation of neuromorphic computerized system configured to implement a heterosynaptic plasticity mechanism in a spiking network is described in detail. The neuromorphic processing system 1130 of FIG. 11B comprises a plurality of processing blocks (micro-blocks) 1140, where each micro-block comprises a computing logic core 1132 and a memory block 1134. The logic core 1132 is configured to implement various aspects of neuronal node operation, such as the node model, and synaptic update rules (e.g., the I-STDP) and/or other tasks relevant to network operation. The memory block is configured to store, inter alia, neuronal state variables and connection parameters (e.g., weights, delays, I/O mapping) of connections 1138.

The micro-blocks 1140 are interconnected with one another using connections 1138 and routers 1136. As it is appreciated by those skilled in the arts, the connection layout in FIG. 11B is exemplary, and many other connection implementations (e.g., one to all, all to all, etc.) are compatible with the disclosure.

The neuromorphic apparatus 1130 is configured to receive input (e.g., visual input) via the interface 1142. In one or more implementations, applicable for example to interfacing with a computerized spiking retina or an image array, the apparatus 1130 may provide feedback information via the interface 1142 to facilitate encoding of the input signal.

The neuromorphic apparatus 1130 is configured to provide output (e.g., an indication of recognized object or a feature, or a motor command, e.g., to zoom/pan the image array) via the interface 1144.

The apparatus 1130, in one or more implementations, may interface to external fast response memory (e.g., RAM) via high bandwidth memory interface 1148, thereby enabling storage of intermediate network operational parameters (e.g., spike timing, etc.). The apparatus 1130 may also interface to external slower memory (e.g., Flash, or magnetic (hard drive)) via lower bandwidth memory interface 1146, in order to facilitate program loading, operational mode changes, and retargeting, where network node and connection information for a current task is saved for future use and flushed, and previously stored network configuration is loaded in its place.

Figure 11C:
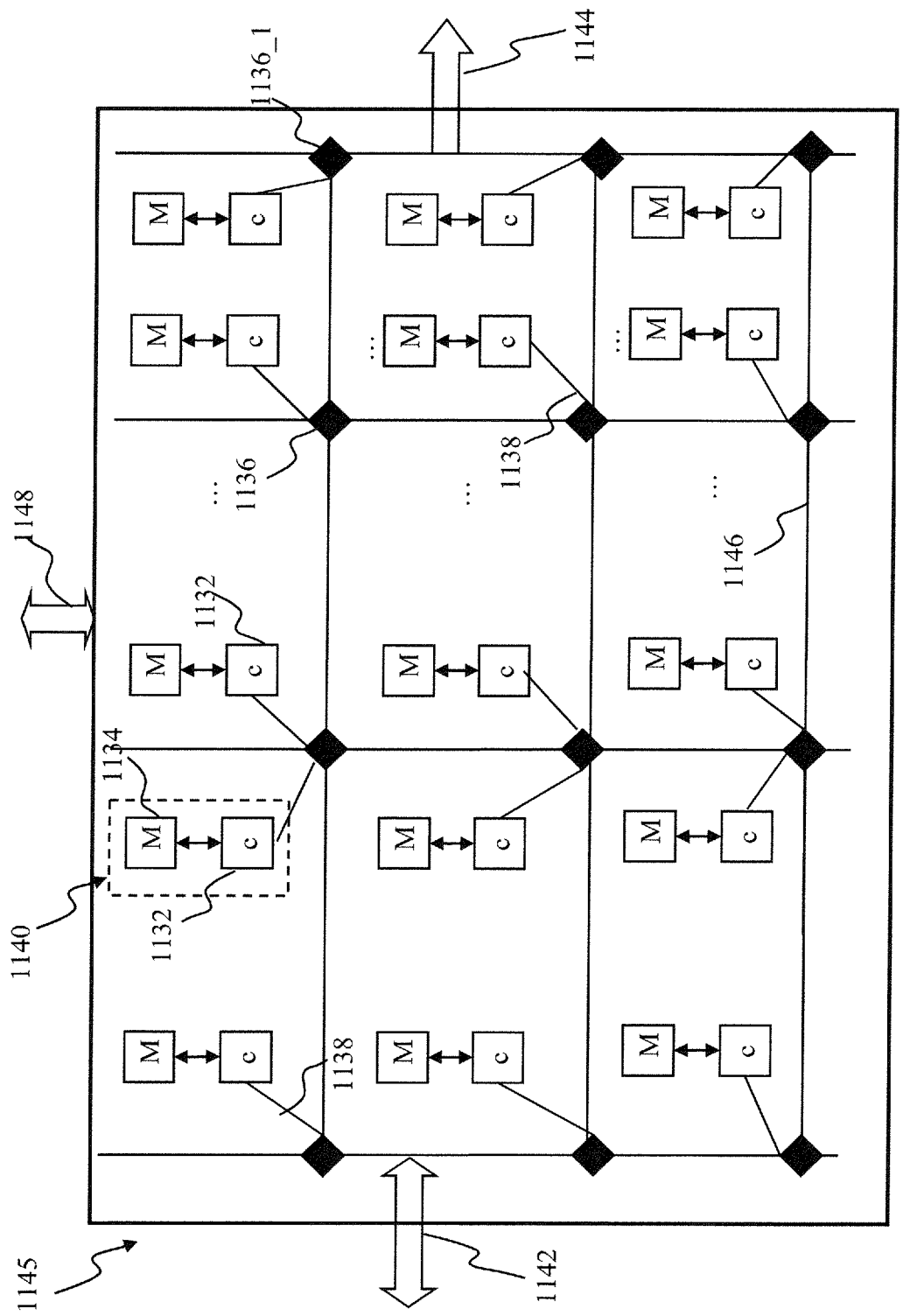
FIG. 11C is a block diagram illustrating a hierarchical neuromorphic computerized system architecture in accordance with inter alia, a heterosynaptic plasticity mechanism in a spiking network, in accordance with one or more implementations.

FIG. 11C illustrates implementations of a shared bus neuromorphic computerized system comprising micro-blocks 1140, described with respect to FIG. 11B, supra, coupled to a shared interconnect. The apparatus 1145 of FIG. 11C utilizes one (or more) shared bus(es) 1146 in order to interconnect micro-blocks 1140 with one another.

Figure 11D:
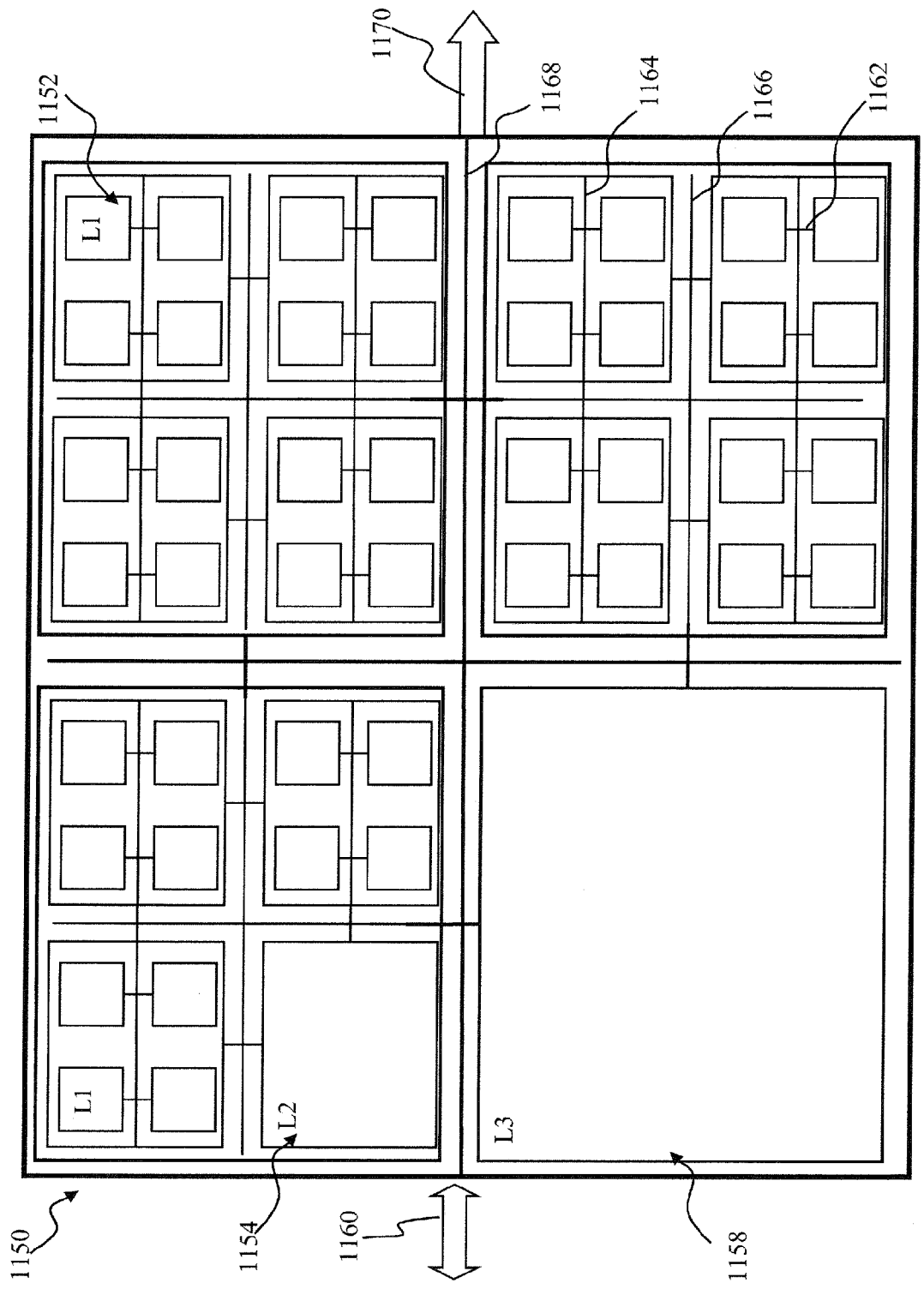
FIG. 11D is a block diagram illustrating cell-type neuromorphic computerized system architecture in accordance with inter alia, a heterosynaptic plasticity mechanism in a spiking network, in accordance with one or more implementations.

FIG. 11D illustrates one implementation of cell-based neuromorphic computerized system architecture configured to implement a heterosynaptic plasticity mechanism in a spiking network. The neuromorphic system 1150 of FIG. 11D comprises a hierarchy of processing blocks (cells block). In some implementations, the lowest level L1 cell 1152 of the apparatus 1150 may comprise logic and memory, and may be configured similar to the micro block 1140 of the apparatus shown in FIG. 11B. A number of cell blocks may be arranges in a cluster and communicate with one another a local interconnects 1162, 1164. Each such cluster may form a higher-level cell, e.g., cell L2, denoted as 1154 in FIG. 11d. Similarly, several L2 clusters may communicate with one another via a second-level interconnect 1166 and form a super-cluster L3, denoted as 1156 in FIG. 11D. The super-clusters 1154 may for example communicate via a third level interconnect 1168, and may form a next level cluster, and so on. It will be appreciated by those skilled in the arts that the hierarchical structure of the apparatus 1150, comprising a given number (e.g., four) cells per level, is merely one exemplary implementation, and other implementations may comprise more or fewer cells per level, and/or fewer or more levels, as well as yet other types of architectures.

Different cell levels (e.g., L1, L2, L3) of the exemplary apparatus 1150 of FIG. 11D may be configured to perform functionality with various levels of complexity. In one implementation, different L1 cells may process in parallel different portions of the visual input (e.g., encode different frame macro-blocks), with the L2, L3 cells performing progressively higher-level functionality (e.g., edge detection, object detection). Different L2, L3 cells may also perform different aspects of operating for example a robot, with one or more L2/L3 cells processing visual data from a camera, and other L2/L3 cells operating a motor control block for implementing lens motion when e.g., tracking an object, or performing lens stabilization functions.

The neuromorphic apparatus 1150 may receive input (e.g., visual input) via the interface 1160. In one or more implementations, applicable for example to interfacing with a computerized spiking retina or image array, the apparatus 1150 may provide feedback information via the interface 1160 to facilitate encoding of the input signal.

The neuromorphic apparatus 1150 may provide output (e.g., an indication of recognized object or a feature, or a motor command, e.g., to zoom/pan the image array) via the interface 1170. In some implementations, the apparatus 1150 may perform all of the I/O functionality using single I/O block (not shown).

The apparatus 1150, in one or more implementations, may also interface to external fast response memory (e.g., RAM) via high bandwidth memory interface (not shown), thereby enabling storage of intermediate network operational parameters (e.g., spike timing, etc.). The apparatus 1150 may also interface to external slower memory (e.g., flash, or magnetic (hard drive)) via lower bandwidth memory interface (not shown), in order to facilitate program loading, operational mode changes, and retargeting, where network node and connection information for a current task is saved for future use and flushed, and a previously stored network configuration is loaded in its place.

Performance Results

Figure 13A:
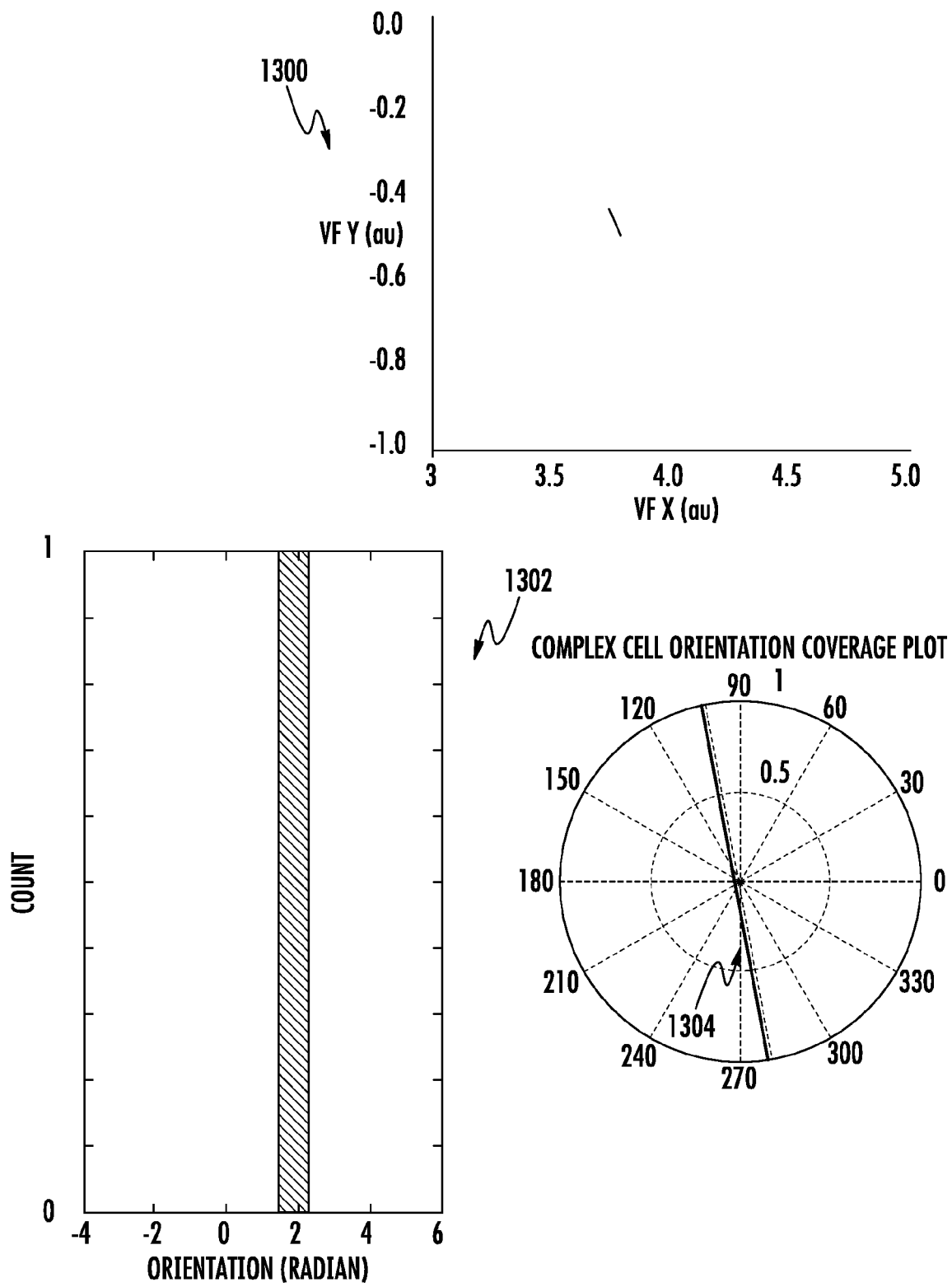
FIG. 13A is a plot illustrating complex cell receptive field obtained with a synaptic update mechanism of the prior art.
Figure 13B:
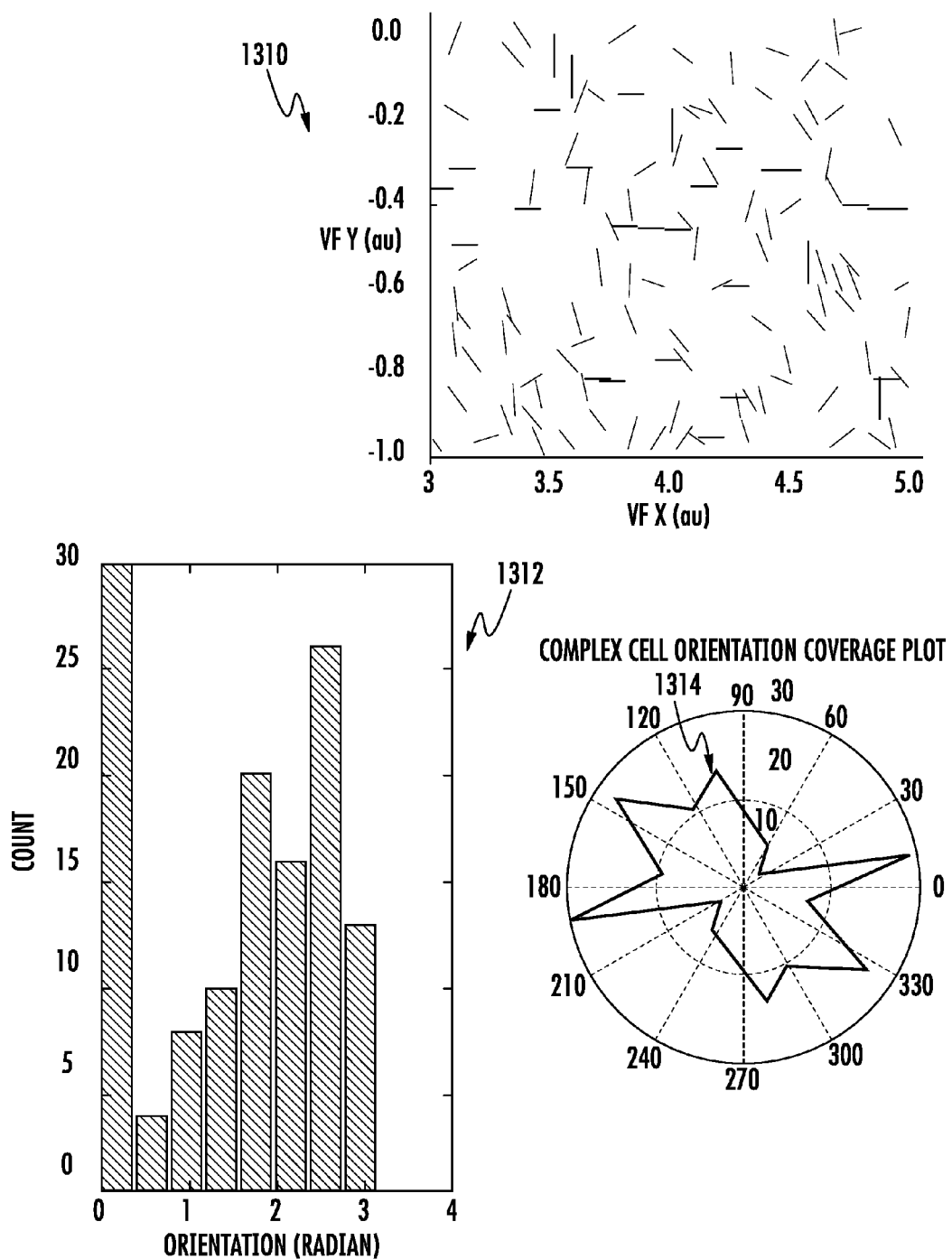
FIG. 13B is a plot illustrating complex cell receptive field diversity obtained with a heterosynaptic update mechanism in accordance with one or more implementations.

FIGS. 13A through 13B present performance results obtained during simulation and testing by the Assignee hereof, of an exemplary computerized neuromorphic apparatus (e.g., the apparatus 1150 of FIG. 11D) capable of implementing heterosynaptic plasticity mechanism described above with respect to FIGS. 5-6B. The exemplary apparatus, in one implementation, may effectuate a spiking neuron network (e.g., the network 400 of FIG. 4) configured to implement one or more realizations of the heterosynaptic plasticity adjustment methodology of the present disclosure.

Figure 12:
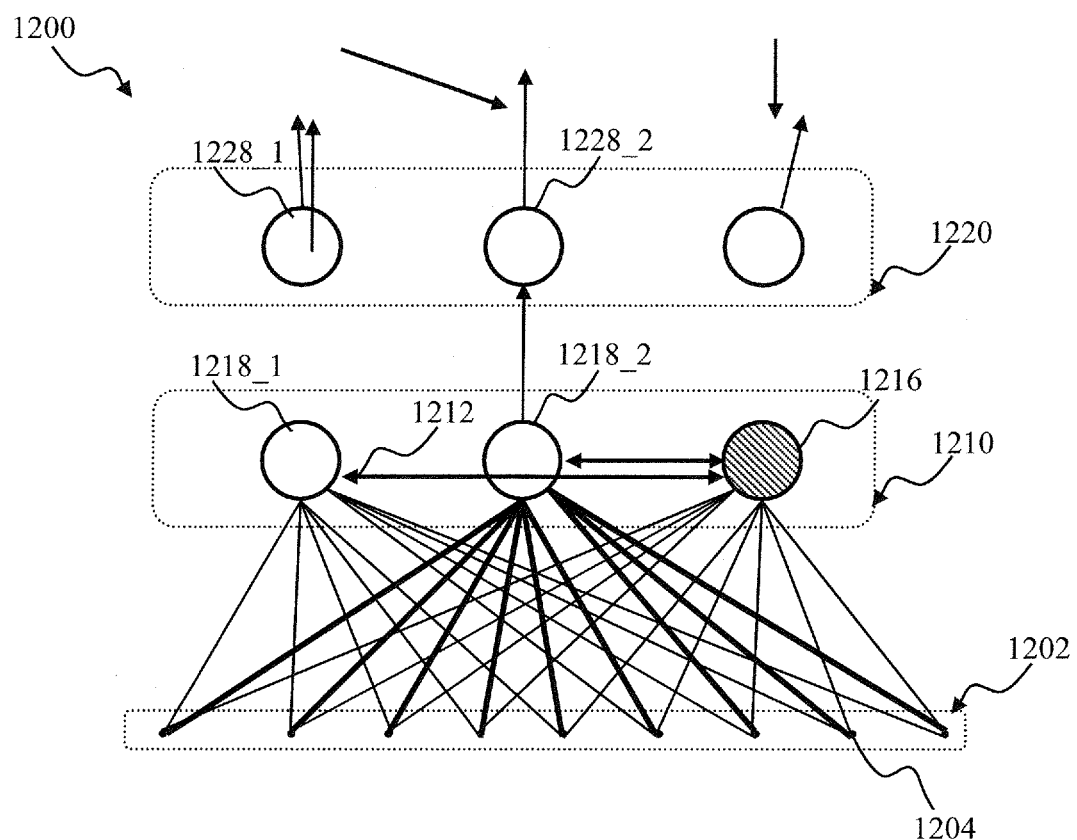
FIG. 12 is a block diagram depicting an artificial spiking neural network used to implement simulations, according to one or more implementations.
Figure 12:
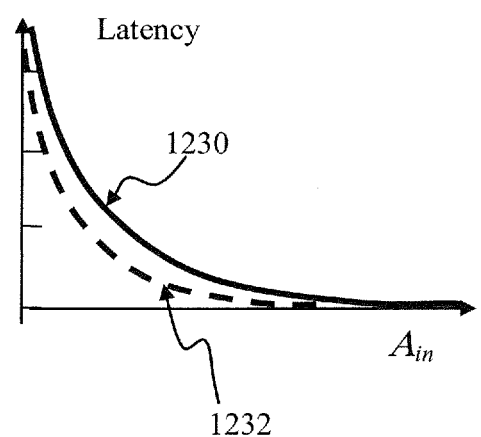

The network, used for the simulations described in FIGS. 13A-13B is illustrated in FIG. 12. The network 1200 comprises an input layer 1202 (e.g., implementing the encoder 1024 of FIG. 10), comprising 938 neurons 1204 configured to implement functionality of parasol RGC, configured to provide feed-forward stimulus to neuron layer 1210. The layer 1202 is configured to implement functionality of L4 layer of visual cortex and it comprises 1613 excitatory regular spiking neurons 1218 (characterized by a regular response time), and 340 L4 inhibitory fast spiking neurons 1216 (characterized by a faster response time). One realization of regular and fast neuron response latency as a function of input stimulus amplitude is shown by the curves 1230, 1232 in FIG. 12. The excitatory neurons 1218 of the L4 layer are configured to provide a NAT signal to each other configured to modify RGCs 1202 to excitatory neurons 1218 connection plasticity in accordance with heterosynaptic plasticity mechanism of the present disclosure.

The output of the L4 layer 1210 is fed to the neuron layer 1220, configured to implement functionality of L23 layer of visual cortex. The layer comprises 822 excitatory regular spiking neurons.

The network was trained for $2 \times 10^7$ steps (20,000 seconds), the learning rate was selected to be equal to 0.01. During simulations, the observed output (firing) rate of L4 excitatory neurons is about 1 Hz for the excitatory neurons 1218, about 2-4 Hz for the inhibitory neurons 1216, and about 0.5 Hz for the excitatory neurons 1228 of the L23 layer.

Figure 12A:
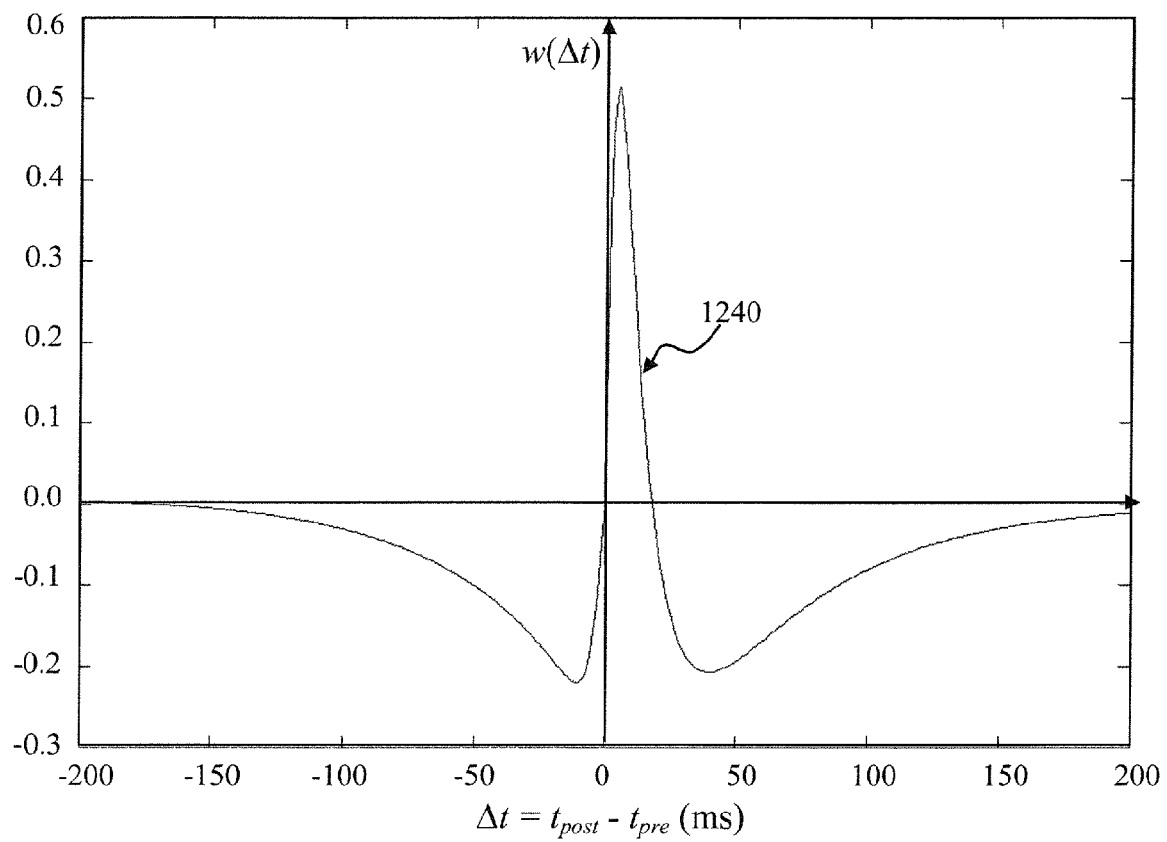
FIG. 12A is a curve illustrating the regular spike-timing dependent plasticity (STDP) rule.

The regular STDP rule (e.g., the rule 610 in FIG. 6A) is shown by the curve 1240 in FIG. 12A. The maximum and minimum weight adjustments associated with the rule 1240 are as follows: $\Delta w_{max} = 0.51428 \times \eta$, $\Delta w_{min} = -0.21939 \times \eta$. In one or more realizations the learning rate $\eta$ is selected equal to 0.01. As seen from FIG. 12A, pre-synaptic and post-synaptic portions of the plasticity rule 1240 cover ±200-ms windows. The first value (i.e., at −200 ms) is applied to any pre-synaptic input prior to −200 ms; and the last value (i.e., at 200 ms) is applied to any pre-synaptic input after 200 ms.

The modified plasticity rule (e.g. the rule 620 in FIG. 6A) is configured as follows:

NAT_Threshold=0.3679;

decay time constant=20 ms;

pre-synaptic NAT weight adjustment (e.g. the level 522 in FIG. 5) is $\Delta w = 0.0$; and post-synaptic NAT weight adjustment (e.g. the level 520 in FIG. 5) is $\Delta w = -0.12 \times activity\_trace \times \eta$ The neighbor activity trace increment (e.g., the increment 504 in FIG. 5) is selected equal 1.0 and MaxNAT is capped at 1.0 as well.

FIGS. 13A-13B present simulation results illustrating L23 excitatory cell receptive fields that were classified as complex. The input stimulus used in the simulations comprises a natural image having a multitude of features at various orientations. The panel 1300 in FIG. 13A depicts the spatial extent of the cell(s) that form orientation specific receptive field in response to input stimulus during simulations. Panels 1302 and 1304 in FIG. 13A depict a histogram (count) and orientation, respectively, of complex cells (neurons) that respond to different orientation in the input stimulus. Data in FIG. 13A, obtained with a plasticity mechanism of prior art, where the plasticity adjustment rule (e.g. the rule 300 in FIG. 3) is maintained throughout simulation, show that all only a single cell (the count of one in the panel 1302) within the network develops orientation-selective receptive field. The orientation of the cell is shown in the panel 1304, and the location of the cell is shown in the panel 1300.

Referring now to FIG. 13B, simulation data obtained with a heterosynaptic plasticity mechanism in accordance with one implementation of the present invention are shown. The panel 1310 in FIG. 13B depicts the spatial extent of the cells that form orientation specific receptive field in response to input stimulus during simulations. Panels 1312, 1314 in FIG. 13B depict a histogram (count), and orientation, respectively, of complex cells (neurons) that respond to different orientation in the input stimulus. Data in FIG. 13B, show a network comprising a heterosynaptic plasticity mechanism having two plasticity rules, employed, for example, in accordance with the methodology described above with respect to FIGS. 5-6B. The network is capable of developing seven distinct receptive field orientations (as seen from the histogram 1312) and fourteen cell directions, as seen from the panel 1314. The spatial locations of the cells are shown in the panel 1310 in FIG. 13B

Comparison of data shown in FIGS. 13A and 13B clearly shows a substantial increase in complex cell receptive field diversity obtained with a heterosynaptic update mechanism of the disclosure, as compared to the prior art.

Exemplary Uses and Applications of Certain Aspects of the Disclosure

Various aspects of the disclosure may advantageously be applied to, inter alia, the design and operation of large spiking neural networks configured to process streams of input stimuli, in order to aid in detection and functional binding related aspect of the input.

Heterosynaptic mechanisms described herein introduce, inter cilia, competition among neighboring neurons by, for example, modifying post-synaptic responses of the neurons so that to reduce number of neurons that respond (i.e., develop receptive fields) to the same feature within the input. The approach of the disclosure advantageously, among other things, (i) increases receptive field diversity, (ii) maximizes feature coverage, and (iii) improves feature detection capabilities of the network, thereby reducing the number of neurons that are required to recognize a particular feature set. It will be appreciated that the increased feature coverage capability may be traded for (a) a less complex, less costly and more robust network capable of processing the same feature set with fewer neurons; and/or (b) a more capable, higher performance network capable of processing larger and more complex feature set with the same number of neurons, when compared to the prior art solutions. The various aspects of the present invention also advantageously allow a given neuronal network to "learn" a given feature set faster than would a comparable prior art network of the same number of neurons, in effect making the inventive network disclosed herein "smarter".

It is appreciated by those skilled in the arts that above implementation are exemplary, and the framework of the invention is equally compatible and applicable to processing of other information, such as, for example information classification using a database, where the detection of a particular pattern can be identified as a discrete signal similar to a spike, and where coincident detection of other patterns influences detection of a particular one pattern based on a history of previous detections in a way similar to an operation of exemplary spiking neural network.

Advantageously, exemplary implementations of the present innovation are useful in a variety of devices including without limitation prosthetic devices, autonomous and robotic apparatus, and other electromechanical devices requiring sensory processing functionality. Examples of such robotic devises are manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), etc.

Implementations of the principles of the disclosure are applicable to video data compression and processing in a wide variety of stationary and portable devices, such as, for example, smart phones, portable communication devices, notebook, netbook and tablet computers, surveillance camera systems, and practically any other computerized device configured to process vision data Implementations of the principles of the disclosure are further applicable to a wide assortment of applications including computer human interaction (e.g., recognition of gestures, voice, posture, face, etc.), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

Advantageously, the disclosure can be used to simplify tasks related to motion estimation, such as where an image sequence is processed to produce an estimate of the object position (and hence velocity) either at each points in the image or in the 3D scene, or even of the camera that produces the images. Examples of such tasks are: ego motion, i.e., determining the three-dimensional rigid motion (rotation and translation) of the camera from an image sequence produced by the camera; following the movements of a set of interest points or objects (e.g., vehicles or humans) in the image sequence and with respect to the image plane.

In another approach, portions of the object recognition system are embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed:

1. A method for increasing receptive field diversity in a neural network having a plurality of neurons, the method comprising a heterosynaptic approach including:
for at least a first one of said plurality of neurons that respond to a stimulus, applying a first plasticity mechanism; and
for a second and at least portion of other ones of said plurality of neurons that respond to said stimulus, applying a second plasticity mechanism different than the first plasticity mechanism;
where at least one of the first or second plasticity mechanisms is based at least in part on a Neighbor Activity Trace (NAT) parameter corresponding to one or more activities of a neighbor neuron competing for features.

2. The method of claim 1, wherein the at least first one of said plurality of neurons that respond comprises at least one neuron that responds before the second and at least portion of other ones of said neurons respond.

3. The method of claim 1, wherein the acts of applying enable different ones of said plurality of neurons to respond to different input features associated with said stimulus, said response to said different input features increasing said receptive field diversity.

4. Computerized spiking neuronal apparatus comprising a storage medium, said storage medium comprising a plurality of executable instructions being configured to, when executed, cause the computerized spiking neuronal apparatus to:
configure an adjustment of excitability of a neuron in accordance with a first mechanism, said configured adjustment being based at least in part on one or more feed-forward inputs; and
where said first mechanism is configured to effectuate a first excitability of said neuron responsive to said one or more feed forward inputs; and
based at least in part on an indication, configure another adjustment of excitability of said neuron in accordance with a second mechanism, said second mechanism configured to reduce a probability of a response by said neuron to said one or more feed-forward inputs subsequent to said indication;
where said second mechanism is configured to effectuate second excitability of said neuron responsive to said one or more feed forward inputs, said second excitability being lower than said first excitability.

5. The apparatus of claim 4, wherein said one or more feed forward inputs comprise feed-forward sensory stimulus.

6. The apparatus of claim 5, wherein:
said one or more feed forward inputs comprises feed-forward sensory stimulus capable of causing generation of a response by said neuron; and
said second mechanism is configured to decrease an efficacy of said connection, thereby reducing a probability of said response being generated.

7. The apparatus of claim 6, wherein:
said response by said neuron is characterized by a response time;
said feed-forward input is characterized by at least an input time;
said decrease of said efficacy is characterized by at least a time-dependent function having said time interval associated therewith, said time interval selected based at least in part on said response time and said input time; and
an integration of said time-dependent function over said time interval results in a negative value.

8. The apparatus of claim 7, wherein:
said increase of said efficacy is characterized by at least one other time-dependent function having said time interval associated therewith; and
an integration of said one other time-dependent function over said time interval results in a positive value.

9. The apparatus of claim 5, wherein said decrease of said efficacy comprises a reduction of at least one weight associated with said connection.

10. The apparatus of claim 9, wherein said reduction of said at least one weight is characterized by at least a time-dependent function having a time interval associated therewith.

11. The apparatus of claim 10, wherein:
said feed-forward input comprises at least one spike having a pre-synaptic time associated therewith;
said time interval is selected based at least in part on said pre-synaptic time and a post-synaptic time associated with said response; and
an integration of said function over said time interval produces a negative value.

12. The apparatus of claim 11, wherein a duration of said time interval is within a range of 5 and 50 milliseconds, inclusive.

13. The apparatus of claim 5, where the plurality of executable instructions is further configured to, when executed, cause the computerized spiking neuronal apparatus to operate said connection in accordance with said second mechanism, wherein:
said indication comprises one other response generated by one other neuron based at least in part on said input; and
said operation of said connection is effectuated based at least in part on said one other response preceding said response.

14. The apparatus of claim 4, wherein said feed-forward input comprises a lateral stimulus.

15. Computerized spiking neuronal apparatus comprising a storage medium, said storage medium comprising a plurality of executable instructions being configured to, when executed:
configure an adjustment of excitability of a neuron in accordance with a first mechanism, said configured adjustment being based at least in part on one or more feed-forward inputs;
based at least in part on an indication, configure another adjustment of excitability of said neuron in accordance with a second mechanism, said second mechanism configured to reduce a probability of a response by said neuron to said one or more feed-forward input inputs subsequent to said indication, where:
said neuron is operable according to a response process characterized by at least a plasticity selection threshold;

said indication is configured to increment a neighbor activity trace (NAT); and said adjustment of excitability of said neuron in accordance with said second plasticity mechanism is effectuated at least in part when said NAT exceeds said plasticity selection threshold.

16. The apparatus of claim 15, wherein:

said neuron is operable according to a response process characterized by at least a threshold, said response process being transitioned to or from said threshold based at least in part on said one or more feed-forward inputs; and said second mechanism is further configured to transition said response process farther away from said threshold as compared to said first mechanism to cause said reduced probability of said response.

17. The apparatus of claim 15, wherein said indication comprises an input received by said neuron via a lateral connection.

18. The apparatus of claim 15, wherein said indication comprises a lateral input generated by another neuron based at least in part on said one or more feed-forward inputs.

19. The apparatus of claim 15, wherein said second mechanism is configured based at least in part on a state parameter intrinsic to said neuron.

20. The apparatus of claim 19, wherein:

said second mechanism is further configured based at least in part on a difference between said state parameter and another state parameter intrinsic to said neuron;

said state parameter is configured to describe neuron excitability; and said another parameter is configured to describe target excitability of said neuron.

\* \* \* \* \*